United States Patent
Britto et al.

(10) Patent No.: US 7,610,383 B2
(45) Date of Patent: Oct. 27, 2009

(54) DATA-OBJECT-RELATED-REQUEST ROUTING IN A DYNAMIC, DISTRIBUTED DATA-STORAGE SYSTEM

(75) Inventors: Arthur Britto, Pleasanton, CA (US); Samuel A. Fineberg, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 410 days.

(21) Appl. No.: 11/502,890

(22) Filed: Aug. 11, 2006

(65) Prior Publication Data

US 2008/0040505 A1   Feb. 14, 2008

(51) Int. Cl.
  *G06F 15/16* (2006.01)
(52) U.S. Cl. .................... 709/226; 709/238; 711/154
(58) Field of Classification Search ......... 709/238–242, 709/226; 711/154, 161–163
  See application file for complete search history.

(56) References Cited

U.S. PATENT DOCUMENTS

| 7,281,097 | B1 * | 10/2007 | Lawson et al. ............. 711/154 |
| 2002/0103943 | A1 * | 8/2002 | Lo et al. ..................... 710/2 |
| 2002/0161917 | A1 * | 10/2002 | Shapiro et al. ............ 709/238 |
| 2005/0125598 | A1 * | 6/2005 | Gilfix et al. ................ 711/108 |
| 2006/0069861 | A1 * | 3/2006 | Amano ....................... 711/114 |
| 2006/0074912 | A1 * | 4/2006 | Borthakur et al. ............ 707/9 |
| 2008/0201488 | A1 * | 8/2008 | Kenner et al. ............... 709/245 |

FOREIGN PATENT DOCUMENTS

| EP | 1 580 655 | | 9/2005 |
| EP | 1580655 | A2 * | 9/2005 |

OTHER PUBLICATIONS

EMC Centera "Content Addressed Storage", Internet Citation, Jun. 2002.
You, L.L., et al., "Deep Store: An Archival Storage System Architecture", Data Engineering, 2005, 21st International Conference on Data Engineering.

* cited by examiner

*Primary Examiner*—Moustafa M Meky

(57) ABSTRACT

One embodiment of the present invention provides an efficient data-object-related-request-routing method and component used within a dynamic, distributed data-storage system for efficiently routing data objects to component data-storage systems when component data-storage systems frequently become unavailable and new component data-storage systems are frequently added to the dynamic, distributed data-storage system. The data-object-related-request-routing method is employed in data-object store operations and data-object retrieval operations. The data-object store and retrieval operations, in turn, are based on identifying certain preferred component data-storage systems within the distributed data-storage system by a component-data-storage-system-ranking method.

16 Claims, 30 Drawing Sheets

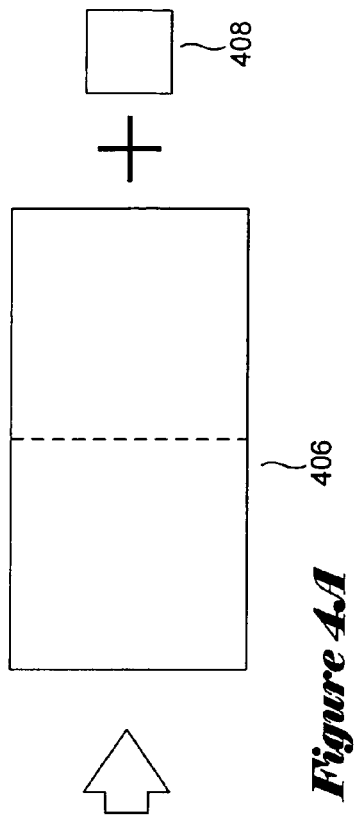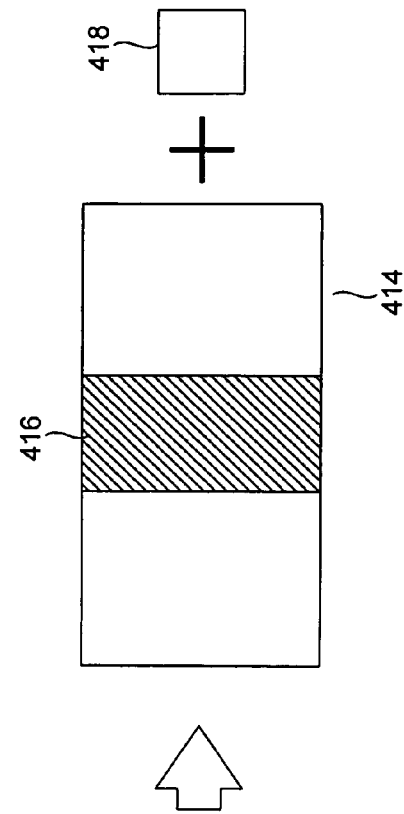
Figure 4A
Figure 4B

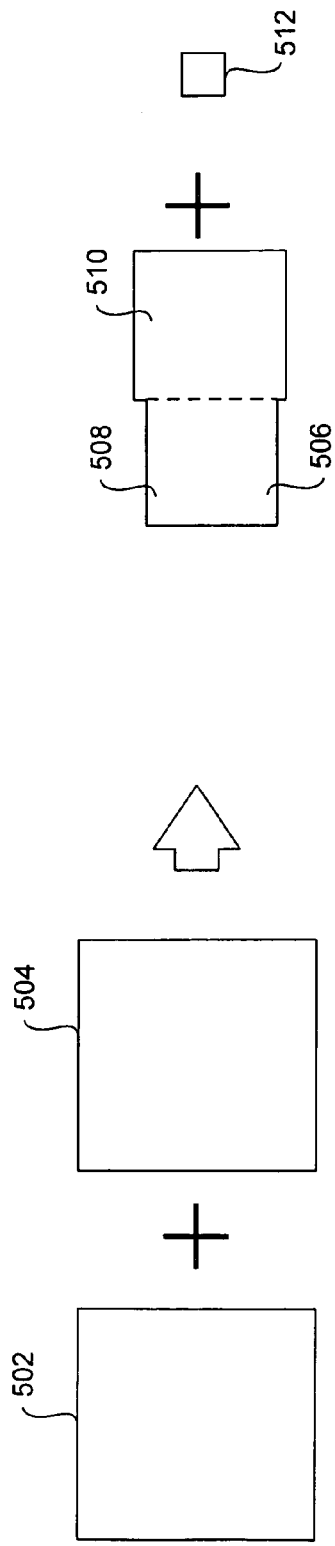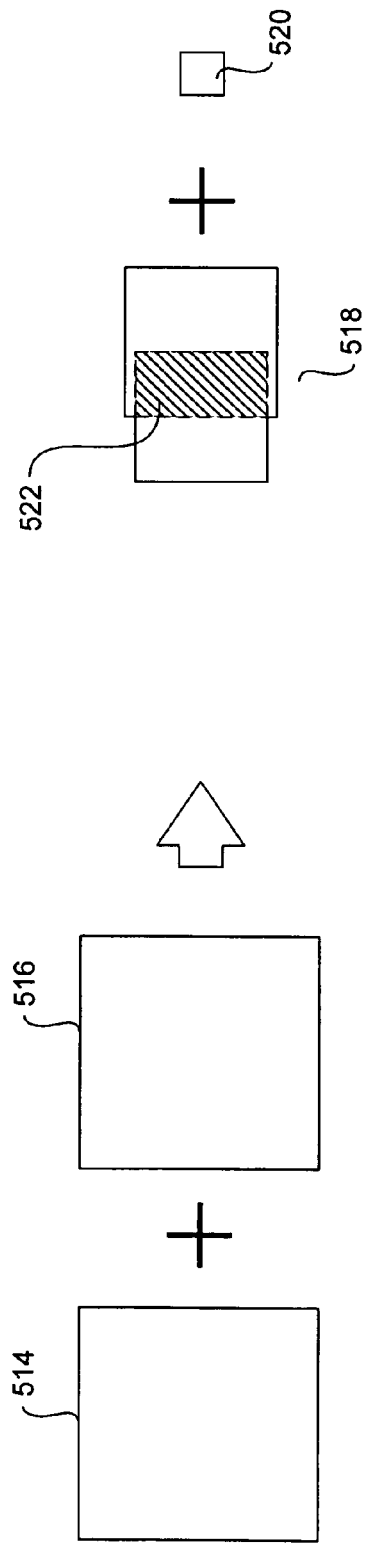
*Figure 5A*
*Figure 5B*

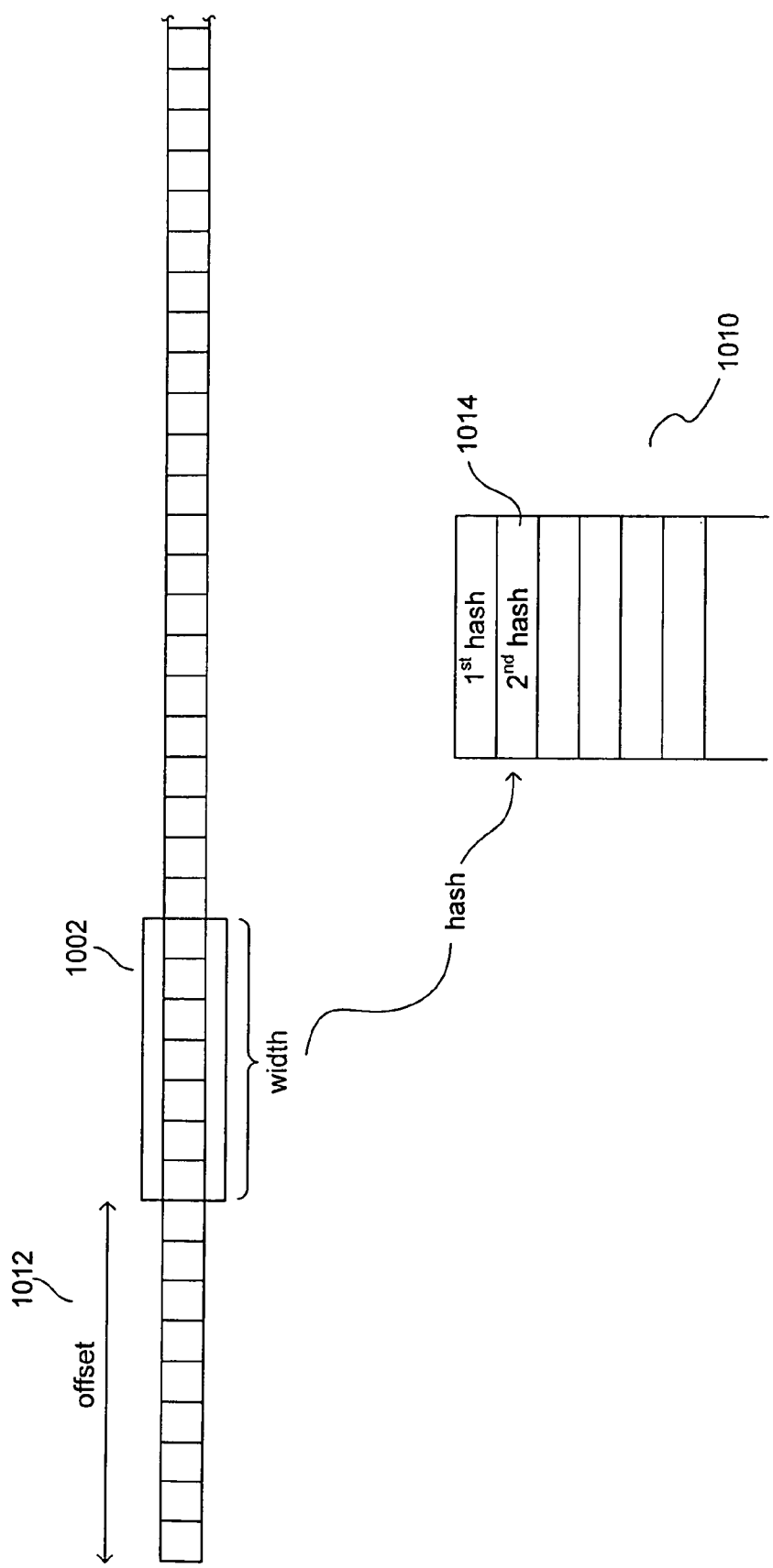

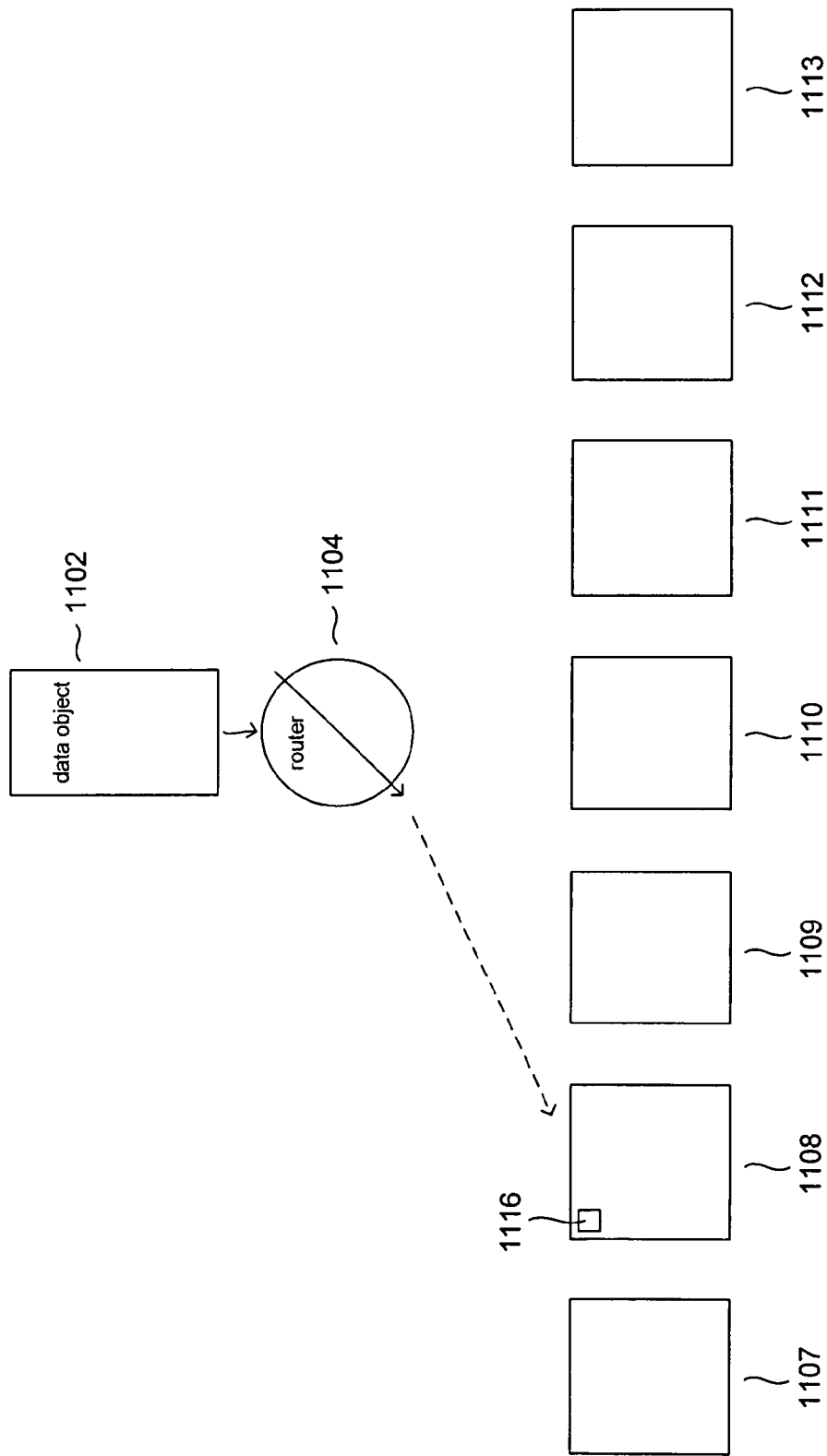

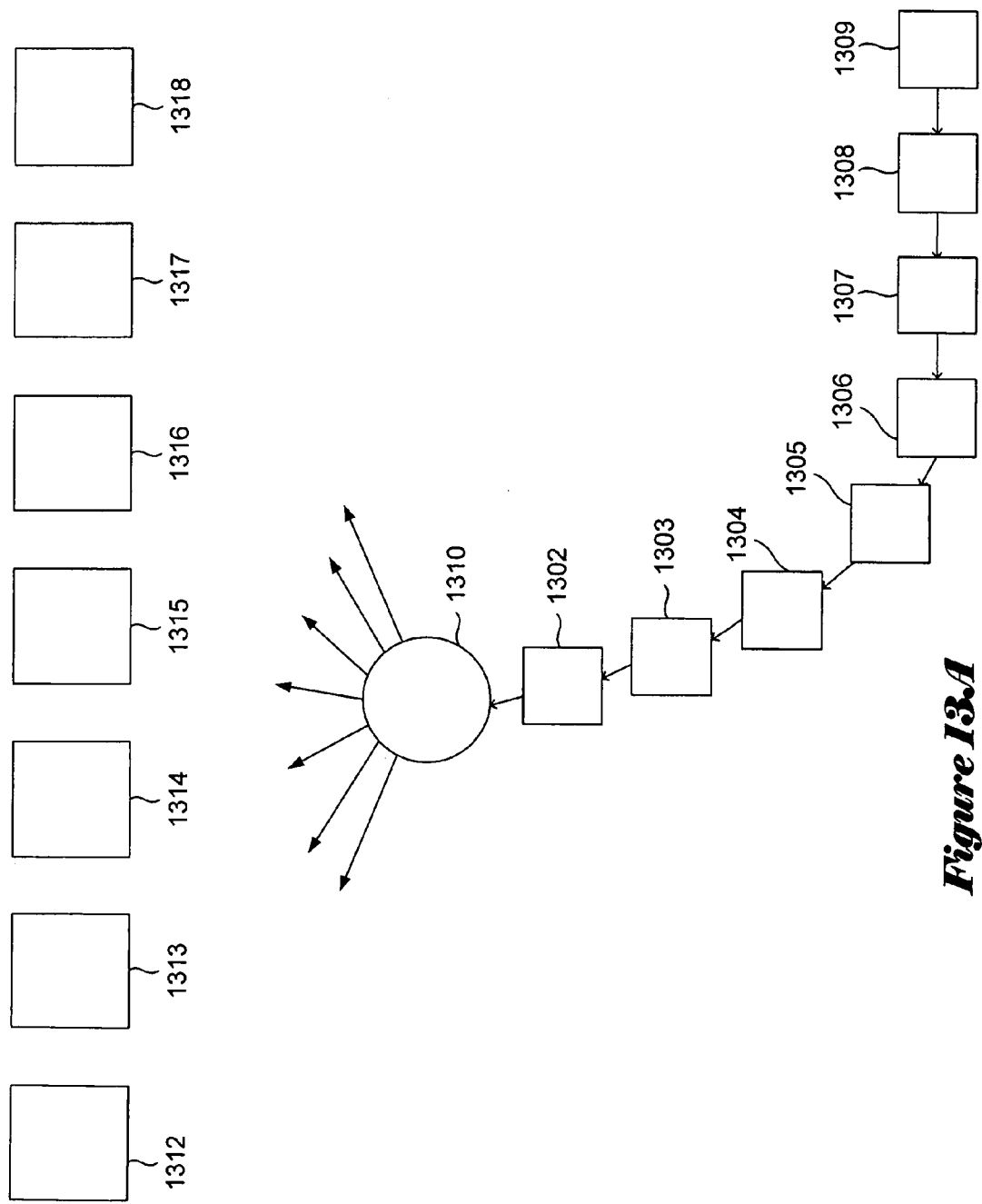

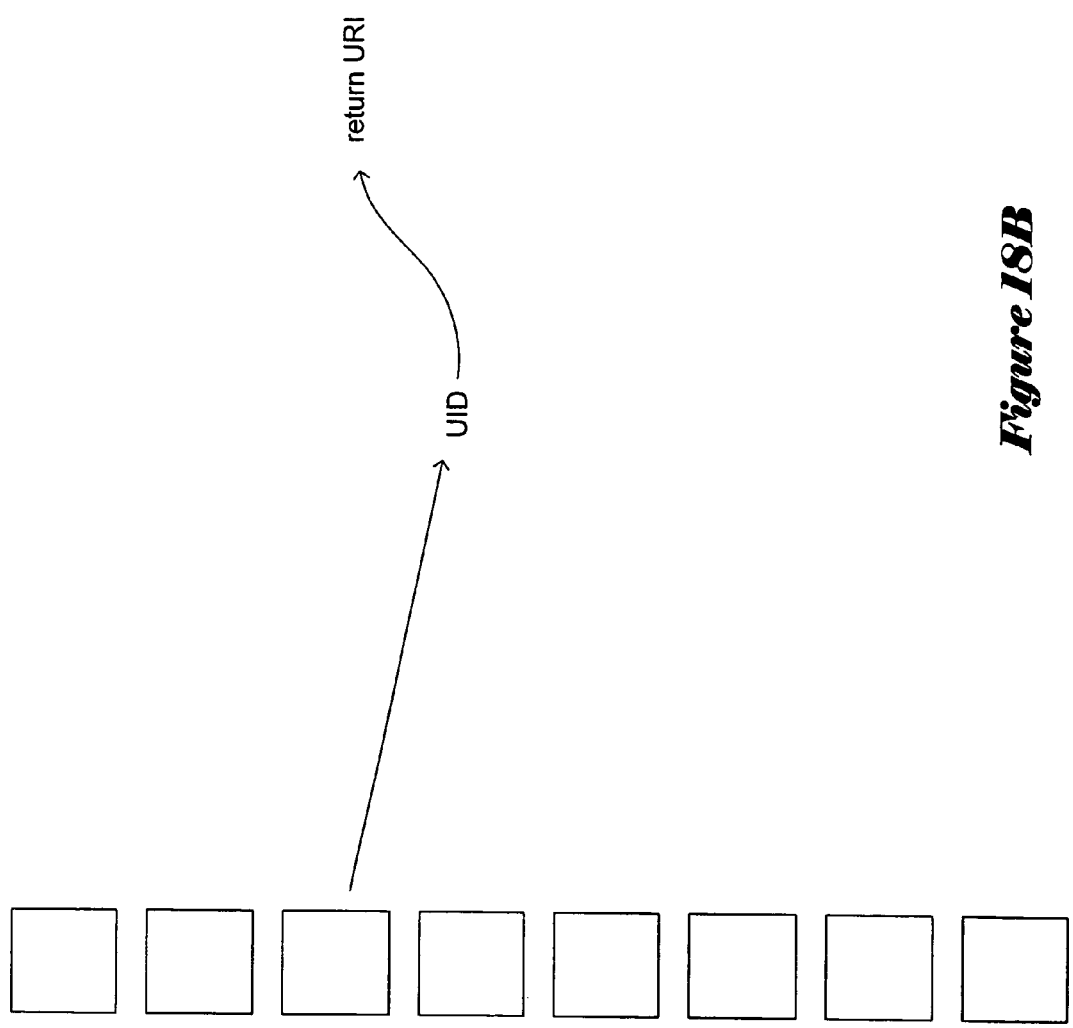

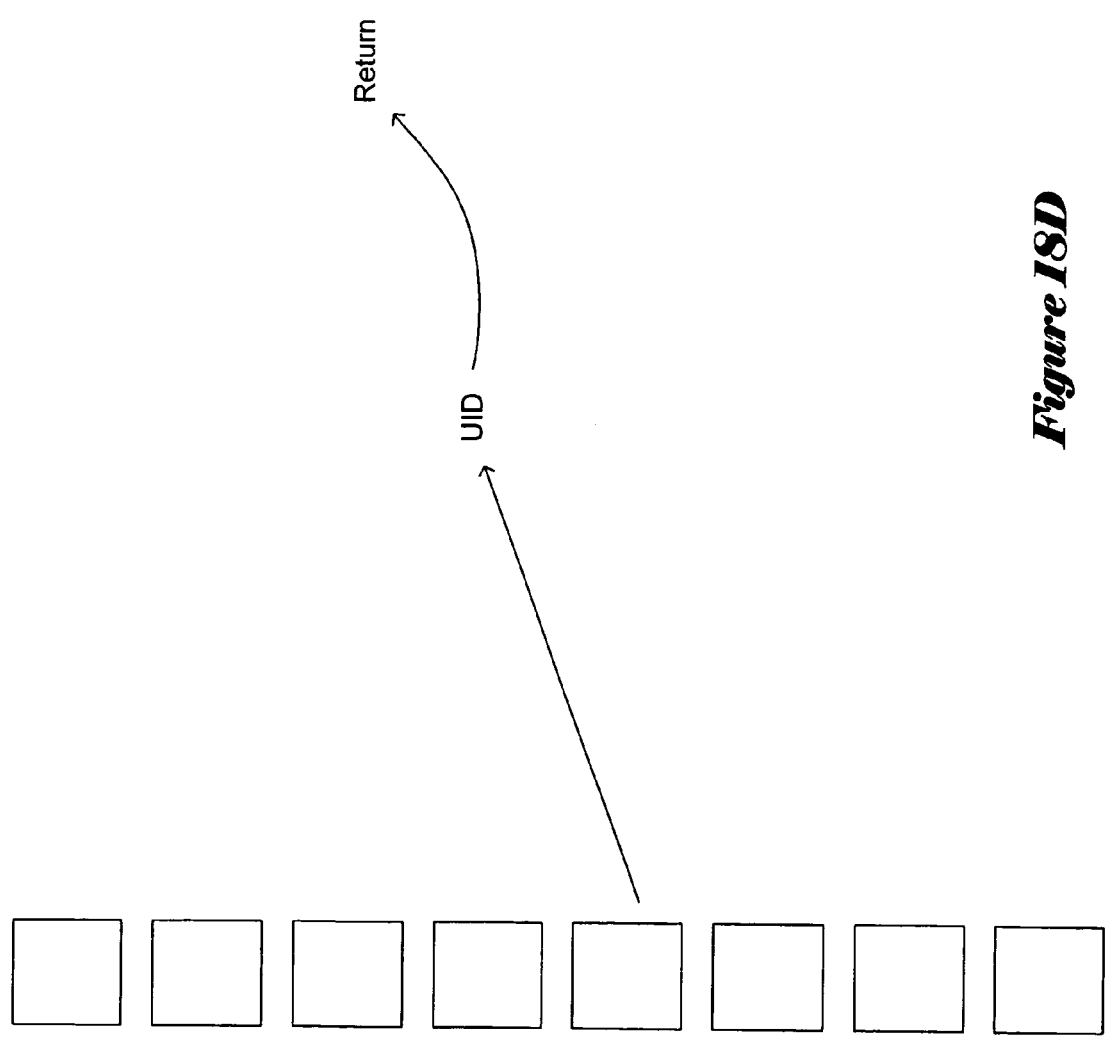

DATA-OBJECT-RELATED-REQUEST ROUTING IN A DYNAMIC, DISTRIBUTED DATA-STORAGE SYSTEM

TECHNICAL FIELD

The present invention is related to data-storage systems and, in particular, to efficient, routing of data-object-related requests and data objects to component data-storage systems of a distributed data-storage system.

BACKGROUND OF THE INVENTION

Since the 1960's, the computer hardware and software industries have provided a relentless and spectacular increase in the capabilities and functionalities of computer-based data processing systems. For example, contemporary office workers are typically equipped with modem personal computers ("PCs") that surpass, in processor speeds, memory sizes, and mass-storage capacities, supercomputers of only 20 years ago. Networking technologies allow PCs to be interlinked with one another and with powerful servers and other computational resources to provide extremely high-bandwidth interconnection between computer users, access by users to vast computational resources, and immense capacities for data storage and retrieval. Today, large and complex business organizations can easily implement highly interconnected, paperless work environments using relatively inexpensive, commercially available computer hardware and software products. However, as the capabilities of computer hardware and software have increased, the amount of data that is generated and computationally managed in business, commercial, and even home environments, has rapidly increased, and the rate of increase in data generation is itself increasing. Computer users may receive hundreds of emails each day, many including photographs, video clips, and complex, multi-media documents. Moreover, many computer users routinely generate large numbers of text documents, multi-media presentations, and other types of data. Much of this data needs to be managed and stored for subsequent retrieval. Recent legislation mandates, for example, reliable storage of emails and other electronic communications generated and received in certain business environments for lengthy periods of time, spanning decades. Although it is possible to purchase ever-larger mass-storage devices and ever-increasing numbers of servers to manage backup and archiving of electronic data on the mass-storage devices, the expense, management overhead, and administrative overhead of storing and managing the large amounts of electronic data may quickly reach a point of commercial and economical impracticality.

One solution to the above-mentioned problems is a new class of distributed data-storage systems. In these systems, a data object is a single routable data entity. An application-level data object may consist of one or more data objects. In certain of these distributed data-storage systems, compression-enhancing data-object routing is used to distribute data objects to component data-storage systems of a distributed data-storage system. Compression-enhancing data-object routing may involve computing a similarity key for each data object in order to, over time, route each group of similar data objects to a single component data-storage system. While compression-enhancing data-object routing techniques work well for relatively static distributed data-storage systems, they may be less satisfactory in certain dynamic, distributed, data-storage systems in which component data-storage systems become unavailable and new component data-storage systems are added to the distributed, data-storage system. For this reason, computer users, business and research organizations, vendors of computer systems and computer software, and various governmental organizations have all recognized the need for improved data-object routing in dynamic, distributed, data-storage systems.

SUMMARY OF THE INVENTION

One embodiment of the present invention provides an efficient data-object-related-request-routing method and component used within a dynamic, distributed, data-storage system for efficiently routing data objects to component data-storage systems when component data-storage systems become unavailable and new component data-storage systems are added to the dynamic, distributed, data-storage system. The data-object-related-request-routing method is employed in data-object store operations and data-object retrieval operations. The data-object store and retrieval operations, in turn, are based on identifying certain preferred component data-storage systems within the distributed, data-storage system by a component-data-storage-system-ranking method.

BRIEF DESCRIPTION OF THE DRAWINGS

FIGS. 4A-B illustrate the difference between a differential data store and a non-differential data store.

FIGS. 5A-B show a more general case in which data objects are compressed individually as well as by differential-storage compression.

FIGS. 10A-D illustrate a general routing method that can be employed in distributed data-storage systems.

FIG. 11 abstractly illustrates data-object routing in distributed data-storage systems.

FIGS. 13A-C illustrate problems associated with certain types of compression-enhancing data-object routing methods.

FIGS. 18A-F illustrate a data-object store operation that represents an embodiment of the present invention.

DETAILED DESCRIPTION OF THE INVENTION

Various embodiments of the present invention are employed in a variety of different types of distributed electronic-data storage systems in which stored data objects are contained within individual component storage systems. In these distributed electronic-data storage systems, each data object is a single routable data entity that may be routed to a component data-storage system in order to achieve desired levels of compression when other, similar data objects are stored on the same component data-storage system. Distributed electronic-data storage systems may use compression-enhancing routing methods, including content-based compression-enhancing routing methods and query-based compression-enhancement routing methods. Embodiments of the present invention include data-object routing methods and router components for systems that provide store and retrieval operations. A number of initial subsections, below, provide discussions of a general architecture for distributed electronic-data storage systems that includes routers that represent embodiments of the present invention, differential-data-storage compression and differential-data-storage metrics used for evaluating the efficiency of differential data-storage systems, compression-enhancing routing, content-based compression-enhancing routing methods, and query-based compression-enhancing routing methods. In a final subsection, store and retrieval operations, applicable to both differential and non-differential storage systems that represent embodiments of the present invention, are discussed.

General Architecture for the Distributed Electronic-Data Storage Systems

Non-distributed Data Storage Systems

Figure 1:
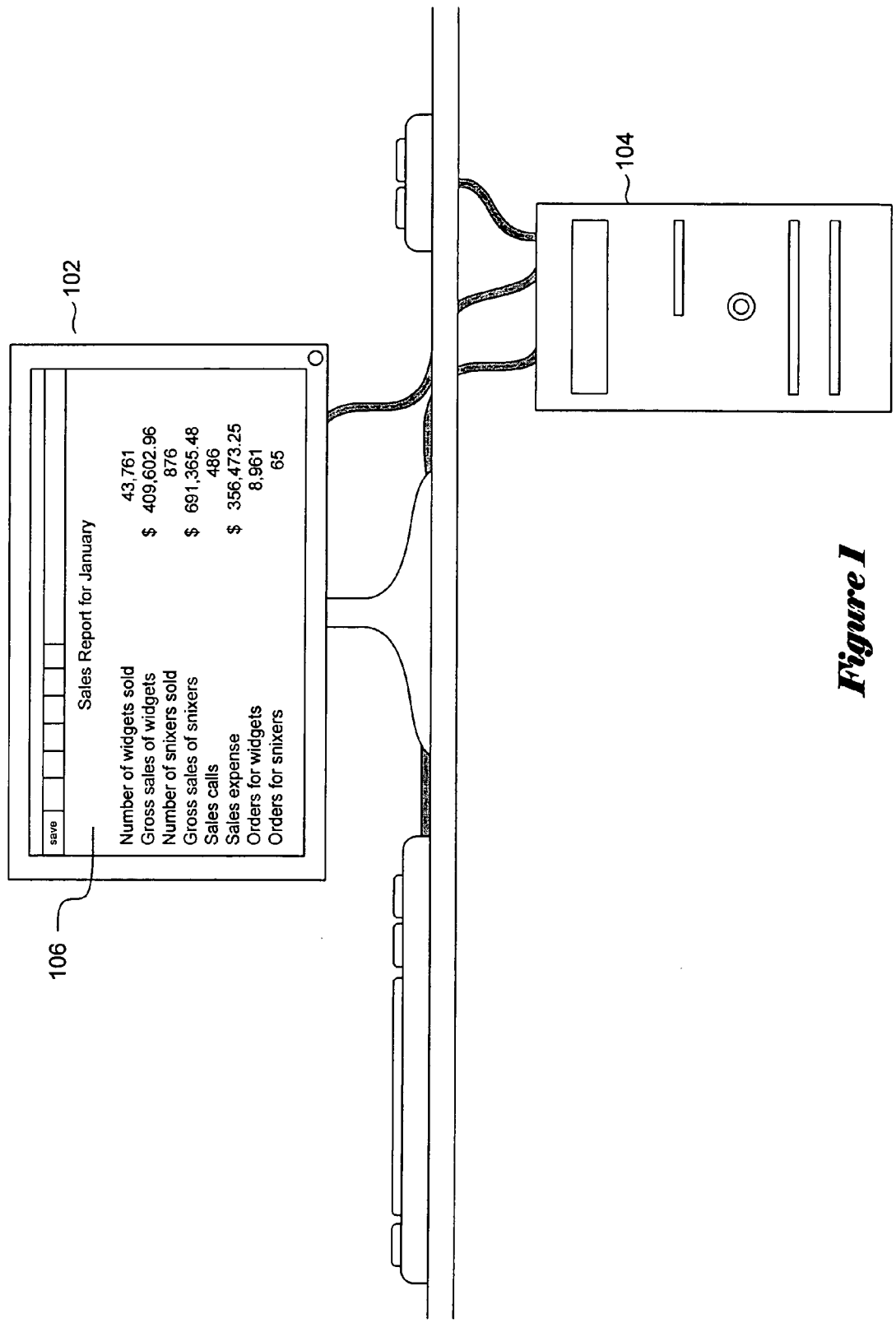
FIG. 1 shows a typical personal computer used in a home or commercial environment.

FIG. 1 shows a typical personal computer used in a home or commercial environment. Personal computers ("PCs") include high-resolution displays 102 and fast processors, large internal RAM memories, and one or more high-capacity disk drives within a main enclosure 104 that allows the PC to store and display many different types of data objects, including photographs, video clips with sound, text documents, multi-media documents, databases, a huge variety of formatted data files, and other such data objects. Many data objects, such as the sales report 106 displayed by the PC shown in FIG. 1, contain information that a user may need to store for various periods of time and refer to subsequently. Business or commercial procedures may require storage of data objects for business and legal purposes. Recently enacted legislation requires certain types of businesses to reliably retain emails and other data objects for specified periods of time, including emails and documents related to various types of asset sales. In addition to needs and requirements for archiving data objects, users may also wish to back up important data objects to protect against failure of the disk drive or other components within the user's PC.

In a first approach to backing up and archiving data, a user may invest in multiple disk drives for the PC, and store backup and archival copies of important data objects on a disk drive allocated for backup and archiving. In slightly more sophisticated systems, a user may employ two or more disk drives within a PC and operating-system features to implement an automated mirroring process by which an exact, mirror copy of a working disk drive is maintained on a separate, mirror disk drive. However, these techniques are inadequate in many commercial and even home situations. First, even when multiple disk drives are employed, theft of, or significant damage to, the PC may nonetheless lead to irretrievable loss of data. Moreover, as operating systems and application programs continue to evolve, the data objects routinely generated by users have tended to become larger and more complex, and are generated at ever-increasing rates. Therefore, a PC often lacks sufficient mass-storage capacity for long-term archiving. Finally, localized strategies for backing up and archiving data generally involve significant management and administrative overhead, as a result of which users often tend to neglect to properly maintain backed up and archived data, and frequently fail to continuously backup and archive data that they may subsequently need. Commercial and governmental organizations cannot generally rely on individual users and employees to administer data backups and data archiving.

Figure 2:
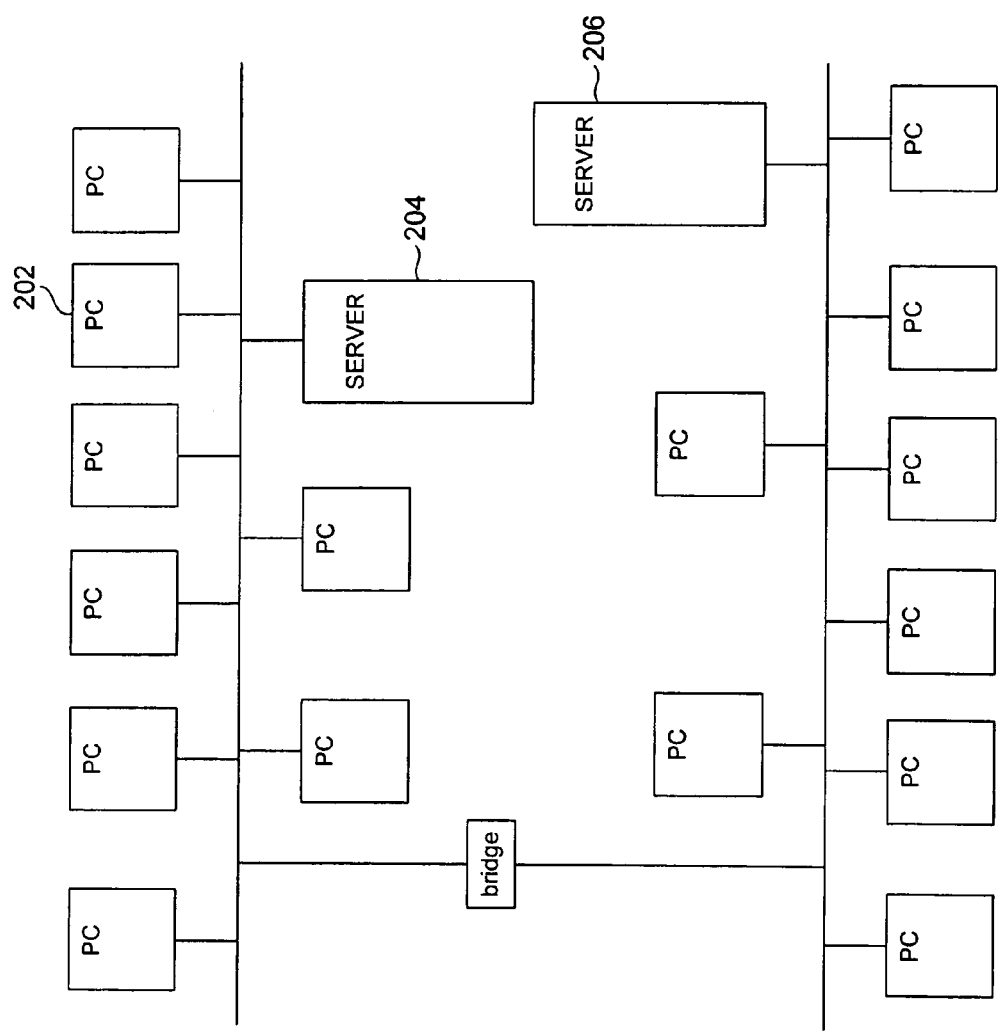
FIG. 2 illustrates a small system of networked computers that might be found within a business organization.

For all of the reasons discussed above, computer users within commercial and governmental organizations, and even certain sophisticated home users of PCs, generally centralize important backup and archiving tasks and policies on servers or larger computers to which the users' PCs are interconnected via computer networks. FIG. 2 illustrates a small system of networked computers that might be found within a business organization. Multiple PCs, including PC 202, are interconnected with one another and with two servers 204 and 206. A system administrator for the networked system generally implements and maintains automated data backup and data archiving using any number of commercially available backup and archiving products. In larger organizations, the servers may be interconnected with independent, large scale mass-storage devices, such as RAID systems, for increased storage capacity.

Networked computer systems with servers dedicated to backup and archiving tasks are far more reliable than localized backup and archiving techniques discussed with reference to FIG. 1. However, even when backup and archiving are administered by a system administrator through one or more high-end servers, serious problems may nonetheless be encountered. For example, even though the servers may be located in a room, floor, or building remote from the locations of the PCs, the entire system may still be susceptible to catastrophic damage from fires, earthquakes, or malicious employees. Furthermore, systems such as the networked computer system illustrated in FIG. 2 are often difficult to scale in order to satisfy increasing needs for data-storage capacity. Adding a new server with attached mass-storage devices may involve significant effort, on the part of system administrators and network administrators, and may require extensive redistribution of data among servers, reconfiguration of individual PCs, and other administrative and management overhead. Furthermore, managing multiple, possibly different servers and adding servers with new or revised operating systems and other components may be quite difficult. Finally, the approaches typified by the network computer system illustrated in FIG. 2 do not efficiently store redundant data. As one example, all or a majority of the employees within an organization may receive many identical emails from internal and even outside sources. These emails may include large attachments, such as .doc files, .ppt files, or .pdf files. Simplistic backup and archiving techniques may redundantly store an identical email sent to 15 employees within the organization 15 times, although a single, reliably stored copy of the email may be sufficient to meet the backup and archiving policies of the organization.

Distributed Electronic Data Archiving

Figure 3:
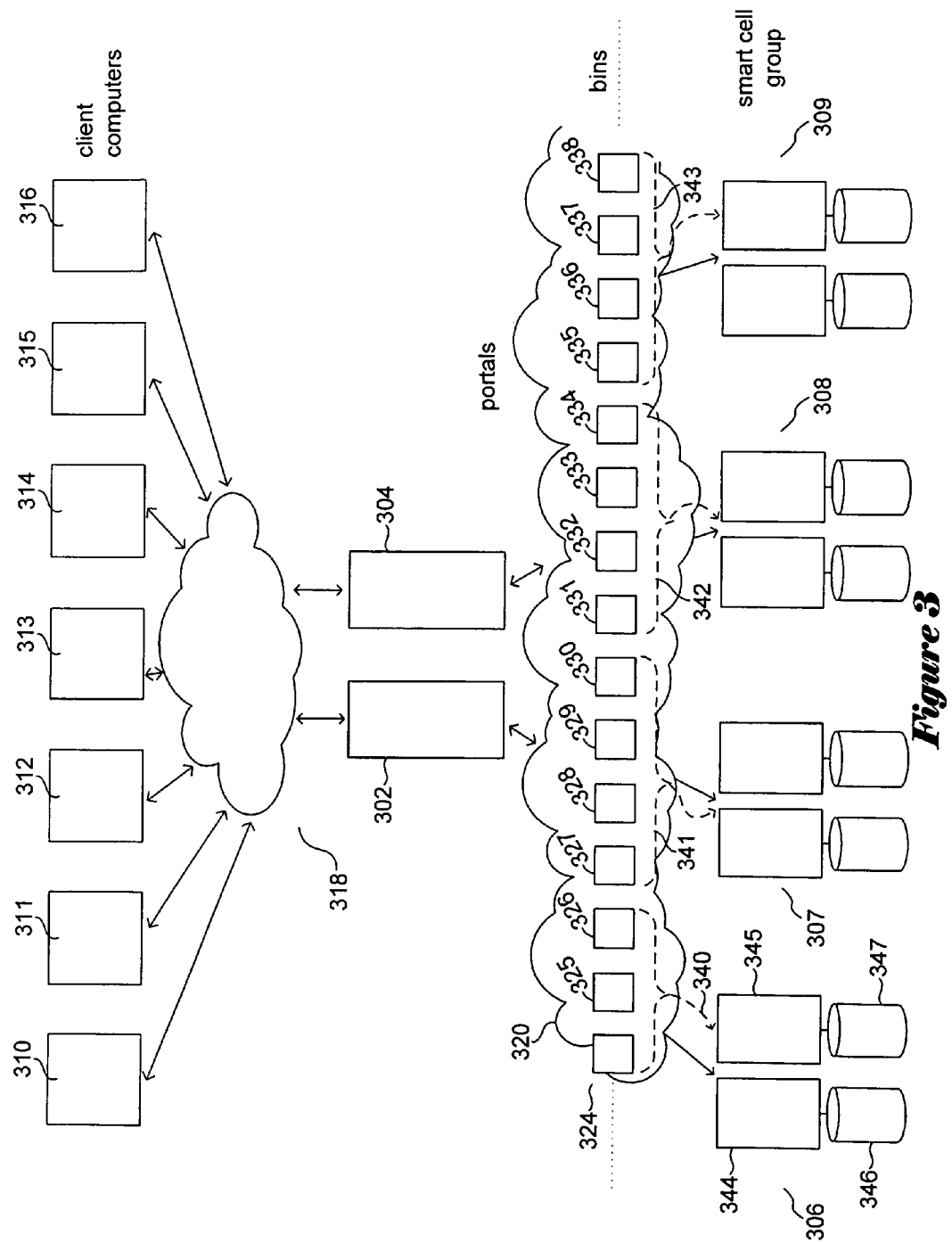
FIG. 3 illustrates the components and component organization of a distributed electronic-data backup and archiving system in which routing-method embodiments of the present invention may be used.

In order to overcome many of the problems of localized backup and archiving, discussed above with reference to FIG. 1, and with ad hoc backup and archiving methods carried out in systems of networked computers, discussed above with reference to FIG. 2, distributed electronic-data backup and archiving systems have been developed. FIG. 3 illustrates the components and component organization of a distributed electronic-data backup and archiving system in which routing-method embodiments of the present invention may be used. As shown in FIG. 3, one or more portals 302 and 304, generally server computers, serve as an interface between the distributed electronic-data backup and archiving system, which includes both the portals and multiple component data-storage systems 306-309, and a potentially large number of client computers, such as client computers 310-316 shown in FIG. 3. In the embodiment illustrated in FIG. 3, the portals receive STORE, RETRIEVE, and other requests from client computers via any of various types of communications media 318 and direct the requests received from the client computers through any of various types of communications media 320 to the component data-storage systems 306-309 of the distributed electronic-data backup and archiving system. Each component data-storage system may include two or more individual computer systems (e.g. systems 340 and 342 of component data storage system 306). Responses to the requests are transmitted from the component data-storage systems back to the portals, which then distribute the responses to the requesting client computers. In certain embodiments, requests are directed by portals to logical bins 324-338 which are, in turn, mapped by the portals 302 and 304 to the component data-storage systems 306-309, in order to facilitate addition of component data-storage systems to an existing distributed, differential store in order to meet increased demands for data-storage capacity.

Each component data-storage system, such as component data-storage system 306, in the distributed electronic-data backup and archiving system comprises one or more computer systems, such as computer systems 340 and 342 in component data-storage system 306. Each computer system has attached mass-storage devices, including attached mass-storage devices 344 and 346 connected to computer systems 340 and 342, respectively. Multiple computer systems with separate, attached mass-storage devices allow for mirroring of data stored in each component data-storage system to increase both availability and reliability of the data store. In certain systems, each component data-storage system includes one or more indexes to facilitate location of data objects stored in the component data-storage system, while, in other systems, such indexes may be separately maintained on component systems distinct from the component systems that store data objects.

Although the component organization shown in FIG. 3 is one example of organization of the components of a client-computer/distributed-differential-electronic-data-backup-and-archiving system, many other component configurations, organizations, and interconnections are possible. For example, in certain embodiments, client computers may directly interface to component data-storage systems through one or more communications media in order to carry out STORE and RETRIEVE transactions with the distributed electronic-data backup and archiving system. In other words, in certain embodiments, portals may be responsible only for receiving and forwarding a subset of requests generated by client computers or, in other embodiments, the portal-based interface may be eliminated altogether. As another example, component data-storage systems in certain embodiments may comprise only a single computer system with attached storage, with data redundancy achieved by means other than inter-device mirroring. However, the component organization and interconnection shown in FIG. 3 is used in the following description of the present invention as an exemplary platform on which method and system embodiments of the present invention are implemented.

A distributed electronic-data backup and archiving system addresses many of the problems associated with PC-based backup and archiving and ad hoc backup and archiving in networked systems, discussed above with respect to FIGS. 1 and 2, respectively. The distributed electronic-data backup and archiving system is an integrated system that provides a relatively simple interface to client computers and other computer resources within an organization. The distributed electronic-data backup and archiving system may be relatively easily managed through management interfaces, may be geographically distributed to prevent data loss associated with catastrophes that may affect all of the computers within a single geographical location, and is easily scaleable, as discussed above, by adding additional component data-storage systems. New component data-storage systems are straightforwardly accommodated by the current distributed electronic-data backup and archiving system, and the granularity of data-storage-capacity increase represented by a component data-storage system allows for non-disruptive and cost-effective tracking of data-storage-capacity needs. The management and administrative burdens associated with integrated distributed electronic-data backup and archiving systems is substantially lower than for the above-discussed ad hoc systems and PC-based backup and archiving. Finally, the distributed electronic-data backup and archiving system may allow for efficient differential storage of data, as discussed in the following subsection, which significantly decreases physical data-storage requirements within an organization.

Differential-Data-Storage Compression and Differential-Data-Storage Metrics Used For Evaluating the Efficiency of Differential Data-Storage Systems FIGS. 4A-B illustrate the difference between a differential data store and a non-differential data store. FIGS. 4A-B and subsequent figures represent the memory required to store or transmit a data object as the area of a simple geometrical figure. In FIG. 4A, two data objects 402 and 404 with sizes corresponding to the areas of the squares used to represent the data objects 402 and 404 are received by a non-differential data store, which stores the two received data objects in an amount of memory 406 equivalent to the sum of the sizes of the two data objects 402 and 404, plus some small additional memory overhead 408 needed for indexing and managing the data objects. By contrast, as shown in FIG. 4B, a differential data store receives two data objects 410 and 412 and stores the two data objects in an amount of memory 414 less than the sum of the sizes of the two received data objects 410 and 412. The cross-hatched portion of the representation of the memory in which the two data objects are stored 416 represents redundant information detected by the differential data store within the two received data objects and stored only once for both data objects, rather than once for each data object. As with the non-differential data store, a differential data store also incurs a small additional overhead 418 of memory in order to index and manage the two stored data objects. Thus, a differential store generally can detect redundancy between a received data object and an already stored data object in order to more efficiently store the received data object. Differential data storage is one form of data compression.

In general, an individual data object may contain a significant amount of redundant information, and may therefore be compressed individually. FIGS. 5A-B show a more general case in which data objects are compressed individually as well as by differential-data-storage compression. A non-differential store may first compress each of the two received data objects 502 and 504 and store the two compressed data objects in a total memory space 506 equal to the sum of the sizes of the compressed data objects 508 and 510, respectively, plus an additional overhead 512. By contrast, a differential data store, as shown in FIG. 5B, may first compress received data objects 514 and 516, and may nevertheless store the two compressed data objects in a memory space 518 smaller than the sum of the memory sizes of the two compressed data objects, with an additional overhead 520. The cross-hatched section 522 of the memory-space representation 518 represents redundant information detected by the differential data store in the two compressed data objects, which is stored once, when the first data object is stored, but not again stored when the second data object is stored. In subsequent discussions, figures such as FIGS. 4A-B are used to indicate differential-data-store efficiencies, whether the differential data-store deficiencies arise from detecting redundancy between uncompressed data objects or compressed data objects. In other words, the additional detail needed to depict both compression arising from differential data storage of multiple objects as well as from compression of individual objects is avoided, for the sake of clarity. It is assumed that the compression achieved by differential storage of data objects is in addition to compression achieved by individually compressing data objects prior to submitting the data objects to the differential data-storage system.

Figure 6:
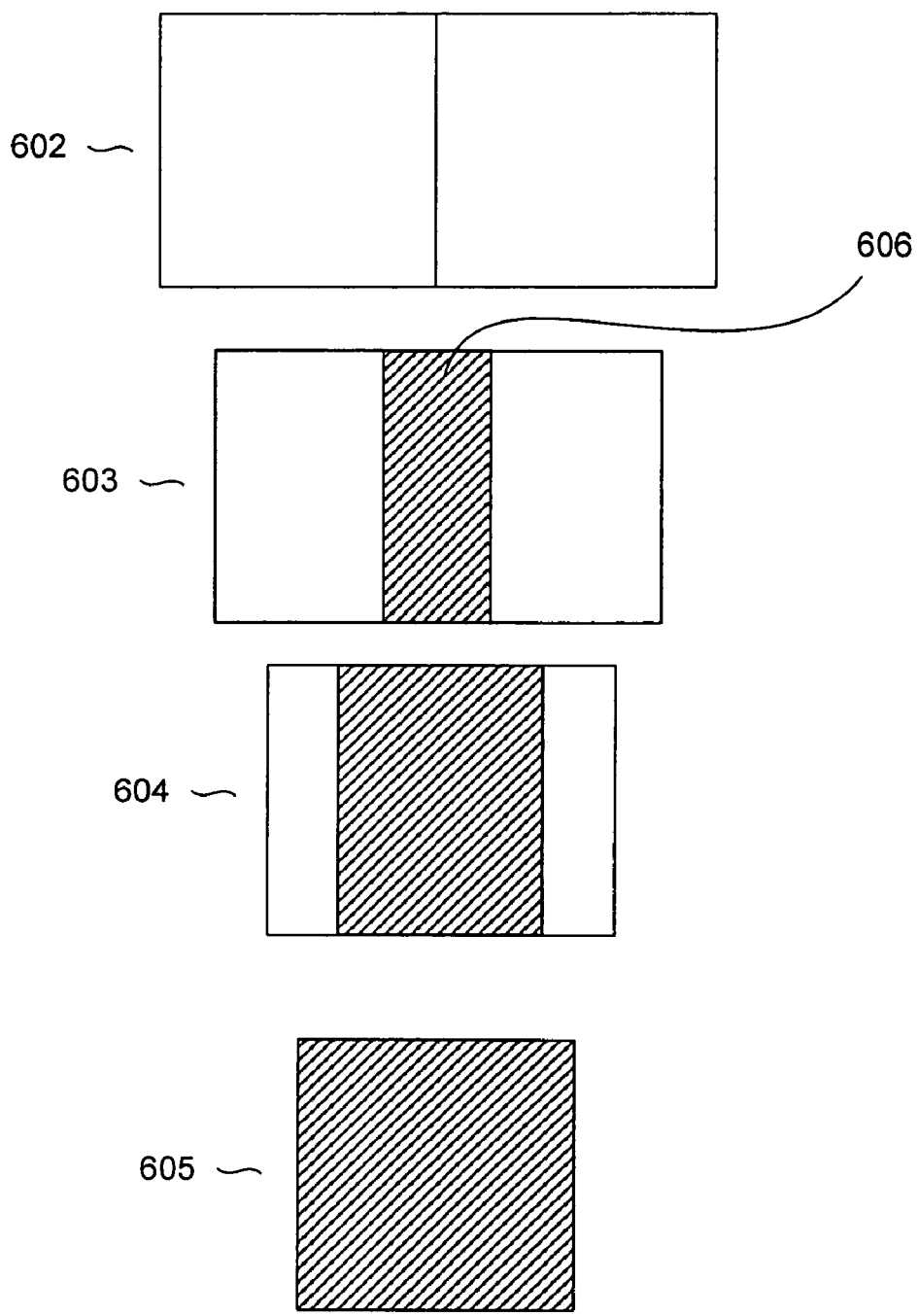
FIG. 6 illustrates various levels of compression possible in a differential data-storage system.

FIG. 6 illustrates various levels of compression achieved for differential storage of two data objects in a differential data-storage system. FIG. 6 uses the same illustration conventions used in FIGS. 4A-B and 5A-B. FIG. 6 shows four memory representations 602-605 of the memory needed to differentially store two data objects at four different levels of compression. The first memory area 602 has a size equal to the sum of the sizes of the individual data objects. In this case, no differential-data-storage compression is obtained by the differential data-storage system, and the storage of the two data objects is equivalent to storage in a non-differential data-storage system. In the second memory area 603, a relatively small amount of redundant data is detected within the two data objects, indicated by the cross-hatched, overlap area 606 shown within the memory area, so that the differential data-storage system stores the two objects in memory of size equal to the sum of the memory sizes of the two data objects minus the size of the redundant data detected within the two data objects. In other words, only a single copy of the redundant data is stored when the second of the two data objects is stored. The memory area 604 shows a larger level of compression obtained in storing two data objects, and the final memory area 605 shows storage of two identical data objects by a differential data-storage system in a memory within the differential data-storage system equal to the size of one of the two identical data objects. A co-compression metric can be used to numerically quantify the degree of compression achieved for two data objects stored within a differential data-storage system, the compression metric mathematically represented as follows:

$$CCM_{O_1, O_2} = \frac{DSI(O_1, O_2)}{DSI(O_1 + DSI(O_2)}$$

where $O_1$ and $O_2$ are the two data objects; and
   DSI( ) is a function that returns the size of the memory needed to store all object arguments in a differential data-storage system in the order specified in the argument list.

This co-compression metric may range from ½, for perfect differential-data-storage compression, to 1, essentially non-differential data storage of the two data objects. This range ignores overhead associated with data-object storage, and non-differential-data-storage compression of the data objects. Many other metrics co-compression metrics are possible, including co-compression metrics with values that range from 0 to 1.

Figure 7:
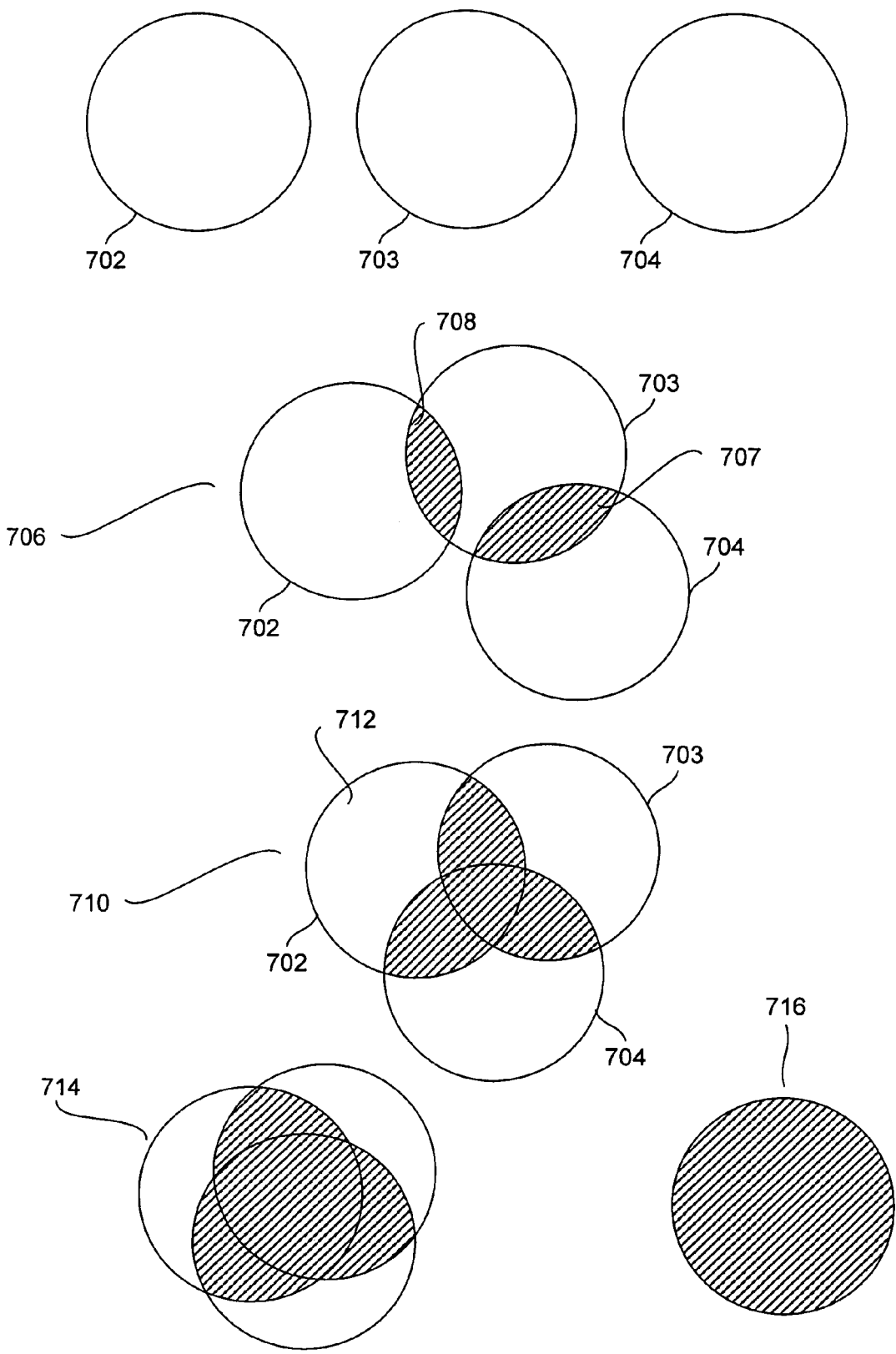
FIG. 7 illustrates varying degrees of compression possible for storing different types of data objects in different types of differential data-storage systems.

Certain distributed electronic-data storage systems may achieve increasingly greater levels of differential-data-storage compression per object when storing more than two data objects, while others may achieve only the pair-wise compression levels discussed above with reference to FIGS. 4A-6. FIG. 7 illustrates varying degrees of compression possible for storing multiple data objects in different types of differential data-storage systems. In FIG. 7, three data objects are illustrated by open circles 702-704. When stored in a non-differential-data-storage system, the memory occupied by the three stored data objects would be equal to the sum of the sizes of the three data objects. In certain differential data-storage systems, redundancies between a currently received data object and only a single, stored data object may be detected and removed by differential data-storage compression. For example, in the first combined memory area 706 shown in FIG. 7, data object 703 is first stored. Next, data object 704 is stored, and the data redundancy between data objects 704 and 703 is recognized so that only a single copy of the redundant information 706 needs to be stored, resulting in the two data objects occupying memory of a size less than the combined sizes of the two data objects 703 and 704. Next, data object 702 is stored. In certain differential data-storage systems, redundancy between data object 702 and only one other, already stored data object can be detected and differentially compressed. As shown in FIG. 7, the redundancy between data object 702 and already stored data objects 703-708 is detected, so that the memory space required to store data objects 702 and 703 is less than the combined sizes of data objects 702 and 703. In other types of differential data-storage systems, additional redundancy can be detected and differentially compressed. In the second combined memory area 710 shown in FIG. 7, redundancies between a given data object to be stored and all previously stored data objects is detected and differentially compressed. Thus, first-stored data object 703 is stored in its entirety. Only the portion of next-stored data object 704 that does not overlap with data object 703 is stored, and, finally, the non-cross-hatched portion 712 of data object 702 is stored, since the cross-hatched portions of data object 702 are redundant with the data already stored for data objects 703 and 704. As the redundant information shared between the three data objects increases, the size of the memory required to store the three objects in such differential data-storage systems decreases, as shown in the combined memory-storage space 714. When all three data objects are identical, as shown in combined data storage space 716, a 1:3 compression ratio may be obtained in the most efficient differential data-storage systems.

Compression-Enhancing Routing

Figure 8:
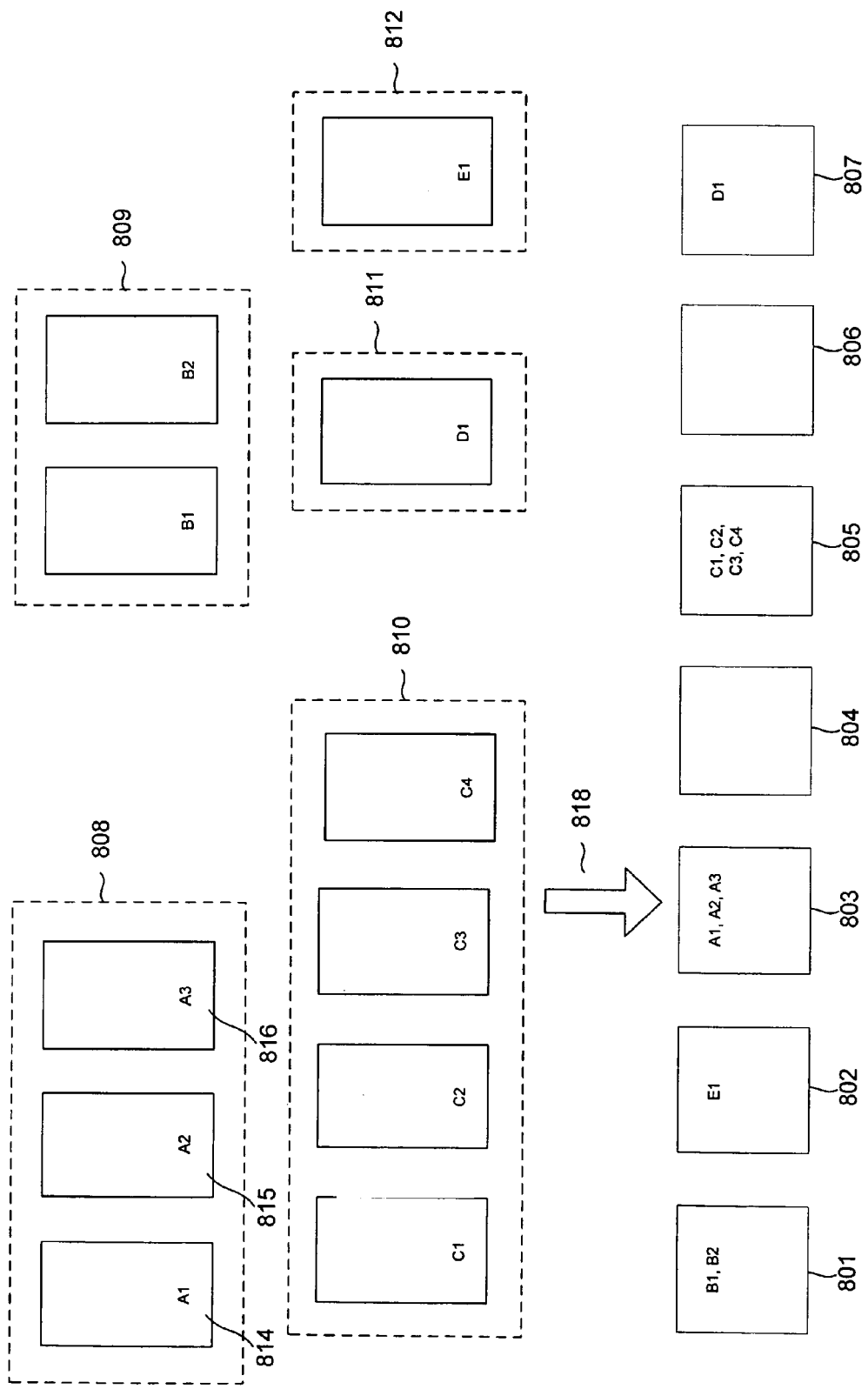
FIG. 8 illustrates several desired properties for routing data objects to individual electronic-data-storage components within a distributed, differential electronic-data storage system.

FIG. 8 illustrates several desired properties for routing data objects to individual electronic-data-storage components within a distributed, differential electronic-data storage system. FIG. 8 shows a distributed, differential electronic-data storage system comprising 7 component data-storage systems 801-807. In FIG. 8, five groups 808-812 of related, or similar, data objects are shown within dashed rectangles. For example, the first data-object group 808 includes the three data objects A1 814, A2 815, and A3 816. The data objects within each group are similar, or, in other words, share a certain amount of data, and are therefore compressible when stored together or successively stored on a particular component data-storage system, while the data objects within one group are dissimilar with respect to the data objects in the other groups, and offer no particular opportunity for data compression by virtue of being stored together. For example, a component data-storage system can generally store similar data objects A1, A2, and A3 in less data-storage space than the sum of the data-storage spaces needed to individually store data objects A1, A2, and A3. However, a component data-storage system generally stores dissimilar data objects A1 and B1 using a data-storage space approximately equal to the data-storage spaces needed to individually store data objects A1 and B1. Therefore, in the class of distributed electronic-data storage systems in which entire data objects are stored within individual component data-storage systems or groups of component data-storage systems, the greatest level of compression, or removal of data redundancy, can be achieved when similar data objects are collocated within individual component data-storage systems or particular groups of component data-storage systems.

In FIG. 8, the arrow 818 represents routing of data objects to individual component data-storage systems 801-807. For greatest overall data compression, as shown in FIG. 8, the routing method 818 directs each data object within a group of similar data objects to a single component data-storage system. For example, all of the data objects A1, A2, and A3 in the first group of similar data objects 808 are routed to component data-storage system 803.

While routing of similar data objects to the same component data-storage system is desirable for maximizing the data compression of a distributed, differential electronic-data storage system, overall data-storage efficiency is increased by relatively uniformly distributing data objects across all of the component data-storage systems. In other words, when each component data-storage system stores an approximately equal volume of data, the overall storage capacity of the distributed, differential electronic-data storage system can be most efficiently used. Otherwise, certain of the component data-storage systems may be filled to maximum capacity while other of the component data-storage systems may remain idle, requiring expensive data redistribution operations or equally expensive and inefficient addition of additional component data-storage systems in order to increase capacity of the distributed, differential electronic-data storage system, even though certain of the component data-storage systems are not storing data. Thus, as shown in FIG. 8, a desirable routing method and system 818 spreads the different, dissimilar groups of data objects 808-812 relatively uniformly across the component data-storage systems 801-807.

In many distributed electronic-data storage systems, it is not necessary that all similar data structures are successfully routed to a single component data-storage system, and it is also not necessary that data be stored in a way that guarantees absolute, uniform distribution of data across all the component data-storage systems. Instead, quality of routing may range from random assignment of data objects to component data-storage systems, regardless of similarity between data objects to ideal collocation of all similar data objects, and may range from non-uniform distribution of data within a distributed data-storage system to an ideal, uniform distribution in which each component data-storage system stores the same volume of data, within the granularity of a minimum data object size. In general, as with most computational systems, there are processing-overhead, communications-overhead, and memory-usage tradeoffs among various approaches to routing, and the closer a routing system approaches ideal uniform data distribution and ideal similar-data-object collocation, the greater amount of processing, memory, and communications resources that may be needed to execute the routing system. In many cases, it is desirable to somewhat relax distribution and collocation requirements in order to increase the speed and efficiency by which data objects are routed.

It should be noted that, in general, data objects are supplied to a distributed, differential electronic-data storage system serially, one-by-one, so that the distributed, differential electronic-data storage system needs to route data objects to component data-storage systems without the benefit of global information with respect to the data objects that are eventually stored within the distributed, differential electronic-data storage system. Moreover, as additional data objects are stored, and already stored data objects are deleted, the data state of a distributed, differential electronic-data storage system varies dynamically, often in a relatively unpredictable fashion. Therefore, strategies for routing data to achieve uniformity of data distribution and collocation of similar data objects are often unavoidably non-optimal. Furthermore, because routing may represent a significant bottleneck with respect to data-object exchange between a distributed, differential electronic-data storage system and accessing host computer systems, router efficiency and routing speed may be limiting factors in overall system performance. It should also be noted that data-object similarity may be measured in many different ways, subgroups of which are relevant to different compression techniques and differential-store strategies employed by different distributed electronic-data storage systems.

Content-Based Compression-Enhancing Routing Methods

Figure 9:
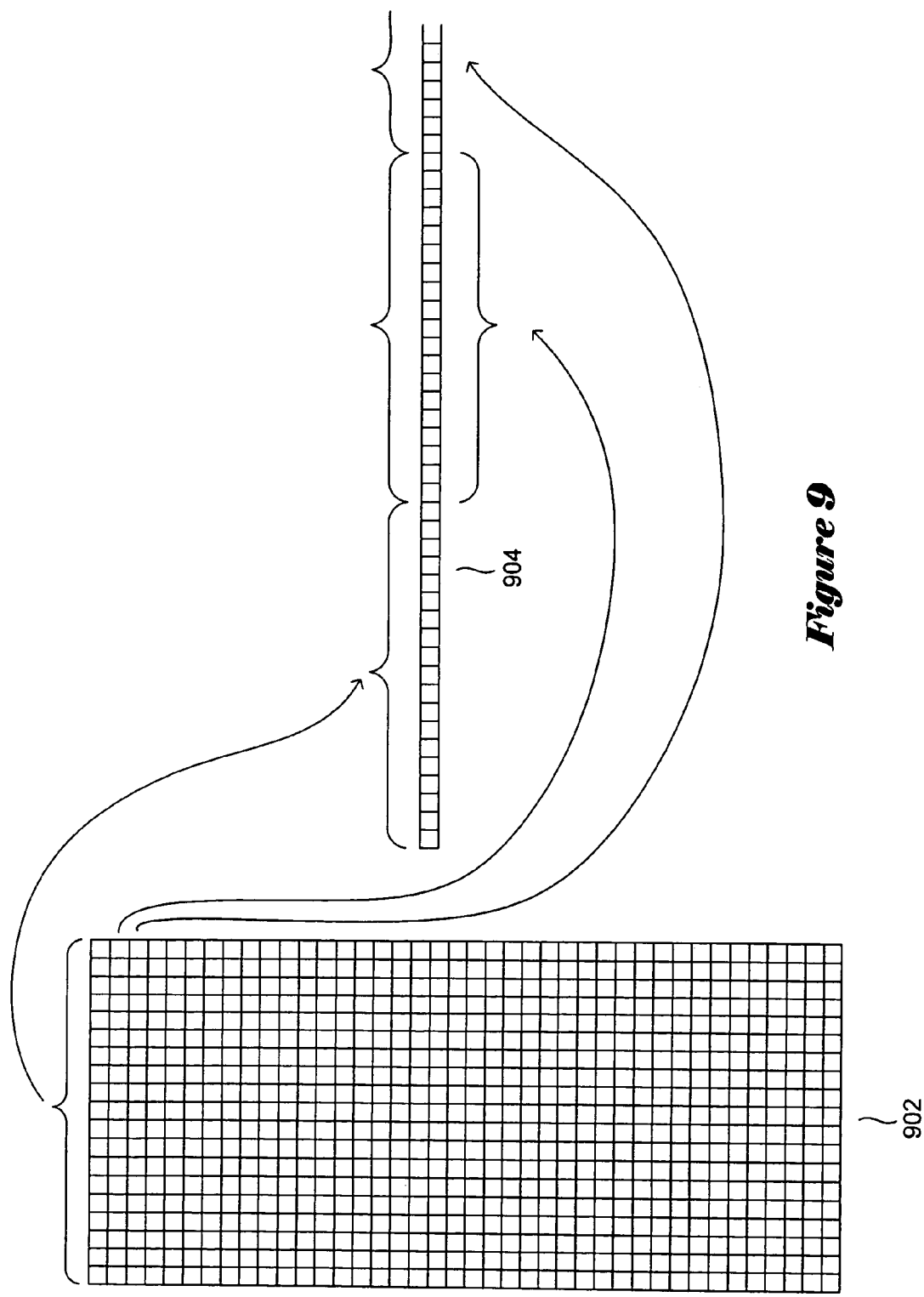
FIG. 9 illustrates a generalized data object routed within a distributed data-storage system.

FIG. 9 illustrates a generalized data object routed within a distributed data-storage system. As shown in FIG. 9, a data object 302 is often considered to be a two-dimensional array of data units. Types of data objects that fit this conceptualization include text documents, digitally encoded photographs, various types of computer-generated data, digitally encoded software programs and executable files, and many other types of data objects. Such data objects can be alternatively viewed as a single, very long, linear array 904 of ordered data units, with the order of data units in the array 904 determined by a deterministic mapping function that maps the two-dimensional array of data units to a single, linear array of data units, and, in fact, are normally stored and manipulated in this fashion by computer hardware and software. For example, as shown in FIG. 9, the lines of a text file may be successively stored in the linear array, line-by-line, to generate a single sequential array of text symbols. In general, regardless of the logical topology of a data object, a data object can be mapped to a single, sequentially ordered, linear array of data units. Data units may include bytes, 16-bit characters, 32-bit integers, or any other convenient primitive data unit into which a data object can be decomposed.

Figure 10A:
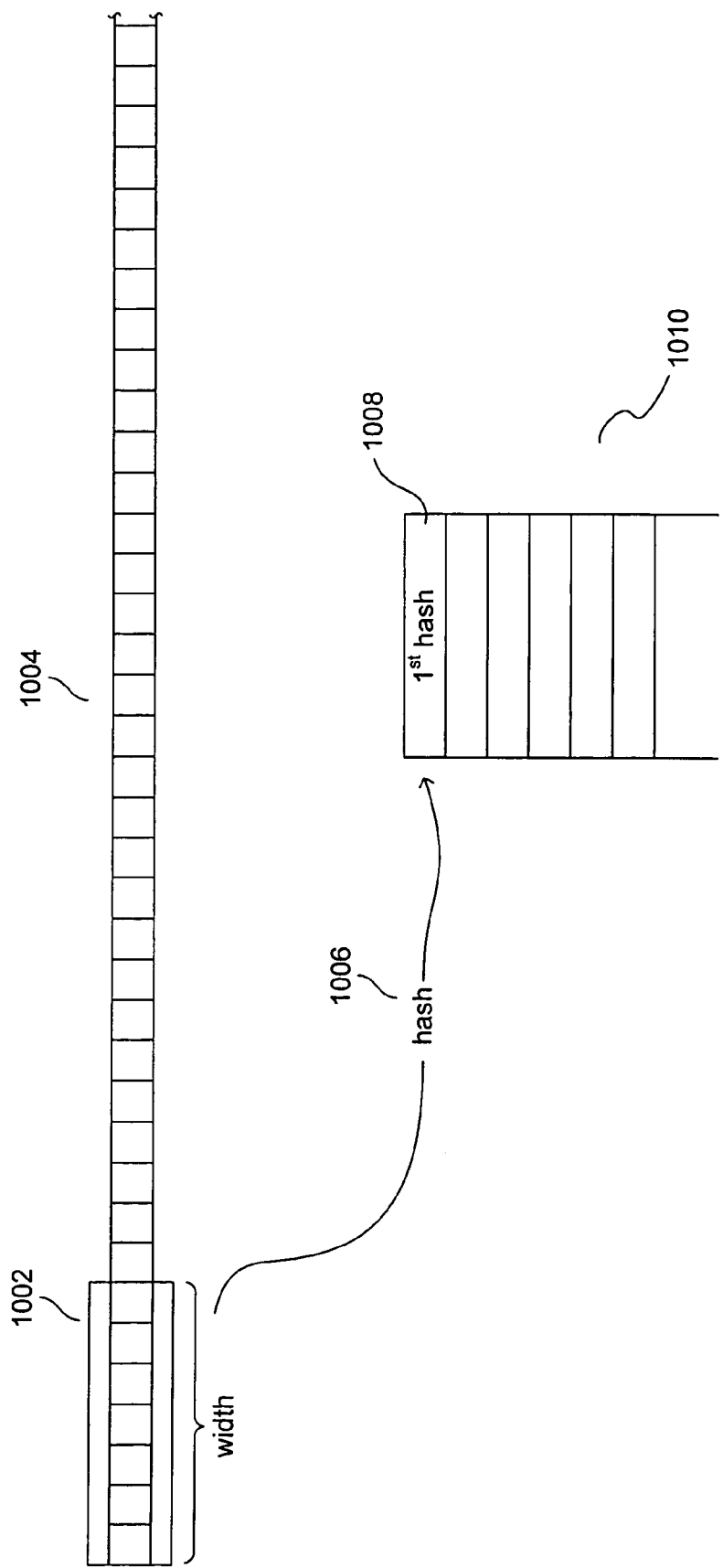

Assuming data objects to be sequentially ordered, linear arrays of data units, routing methods may process the data objects in order to first generate a digitally-encoded value, or similarity key, such as a large integer, that is generally much smaller than the data object, in order to represent or characterize the data object. Then, in a second step, routing methods may, typically using modulo arithmetic, generate a component data-system index or address for directing the data object represented or characterized by the digitally encoded value to a particular component data-storage system or group of data-storage systems. FIGS. 10A-D illustrate a general routing method that can be employed in distributed data-storage systems. As shown in FIG. 10A, a relatively small window 1002 of successive data units within the linear array representing the data object 1004, generally left-justified with the first data unit in the array 1004, is first considered. The window has, in many embodiments, a fixed width. For example, in FIG. 10A, the window 1002 has a width of seven data units. A procedure or function is used to generate a digitally-encoded value based on the data-unit contents of the window. In general, such functions are referred to as hash functions 1006. Hash functions generate the same, unique number for each instance of a window containing identical data-unit values or is, in other words, repeatedly deterministic. The hash values generated for two data windows containing one or more different data-unit values are generally different. However, viewing the contents of the data window as encoding a large binary number, since the larger number of possible data-window values are mapped to a smaller number of possible hash values, hash functions unavoidably produce collisions in which two windows containing differently valued data units generate the same hash value. There are many different types of hash functions with different distribution characteristics. These classes of hash functions may be more or less useful for data-object routing within distributed electronic-data storage systems depending on expected distributions of, and types of, data objects stored within the systems. Selection of hash functions appropriate for particular data-object-routing problems is beyond the scope of the present application. However, collision-resistant hash functions and similarity-preserving hash functions within the family of hash functions referred to as "cryptographic hash functions" are often used to good effect for data-object routing. Once a hash value has been generated 1006 from the data-unit contents of the data window 1002, the hash value is stored in a first entry 1008 of an array of hash values 1010.

Figure 10C:
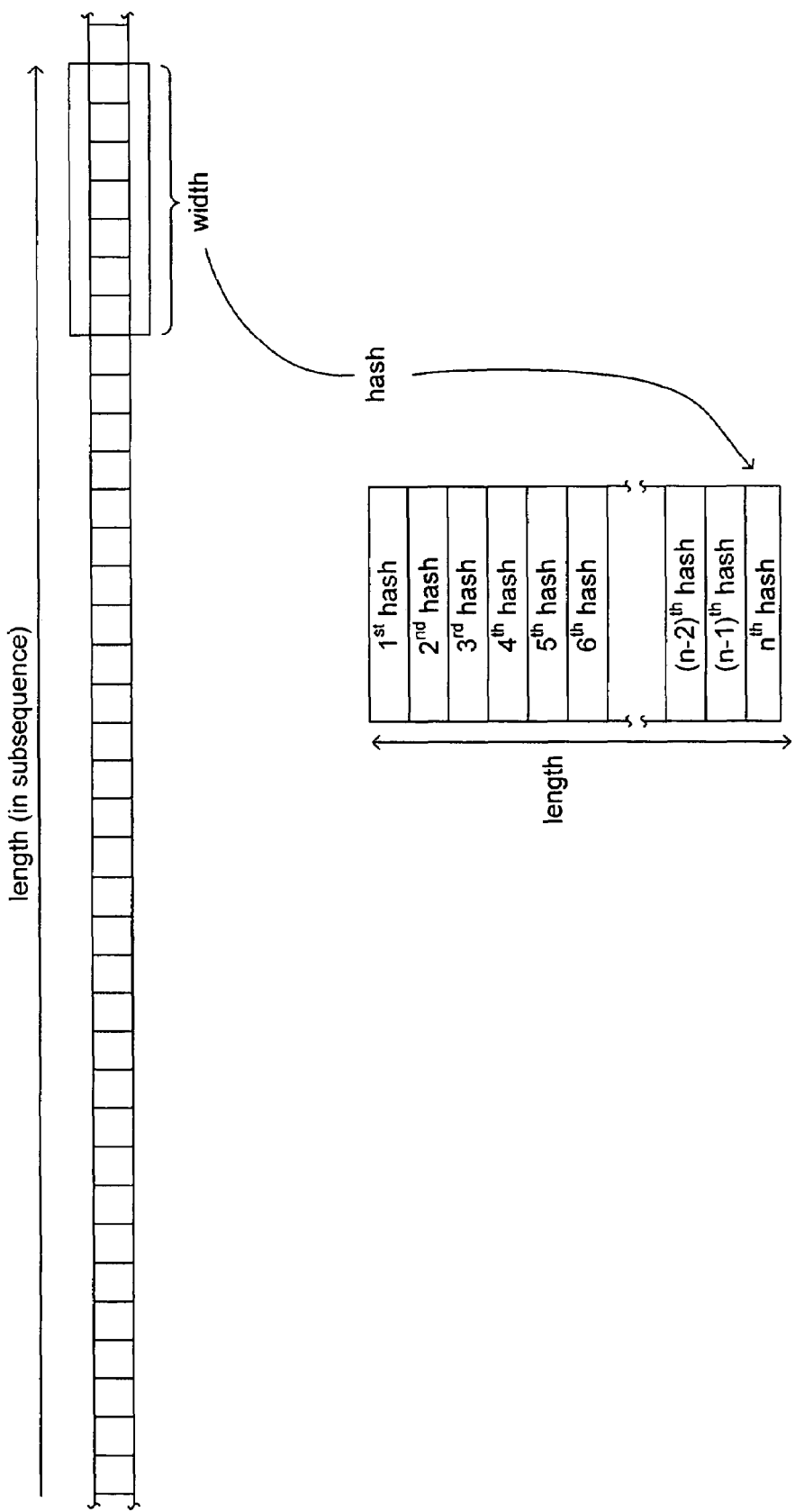

Next, as shown in FIG. 10B, the window 1002 is displaced from the initial position of the window, shown in FIG. 10A, by some number of data units referred to as an offset 1012. The new data-unit contents of the data window, following displacement of the data unit by the offset, are provided to the hash function to generate a second hash value which is stored in the second entry 1014 of the array of hash values 1010. The process of displacing the window by the offset and computing a next hash value continues until a number of hash values, referred to as the "length," have been generated, as shown in FIG. 10C. The length may be measured either in terms of the number of hash values generated, or in terms of the number of data units traversed in the window-displacement and hash-value-computation method illustrated in FIGS. 10A-C. The length may be equal to the total possible number of hash-value-generation steps over the linear-array representation of the data object, or may be a smaller number. When the offset is equal to or greater than the window width, each window of data units is often referred to as a "chunk." Conversely, when the offset is one data unit, the series of overlapping windows obtained by the above-described method are often referred to as n-grams. Certain routing methods may vary the width of the window during the process, producing variable-sized chunks, in the case of non-overlapping windows, from which hash values are generated. The offset, width, and length parameters may be fixed or may vary, in general, in the range of possible implementations of various routing methods.

Figure 10D:
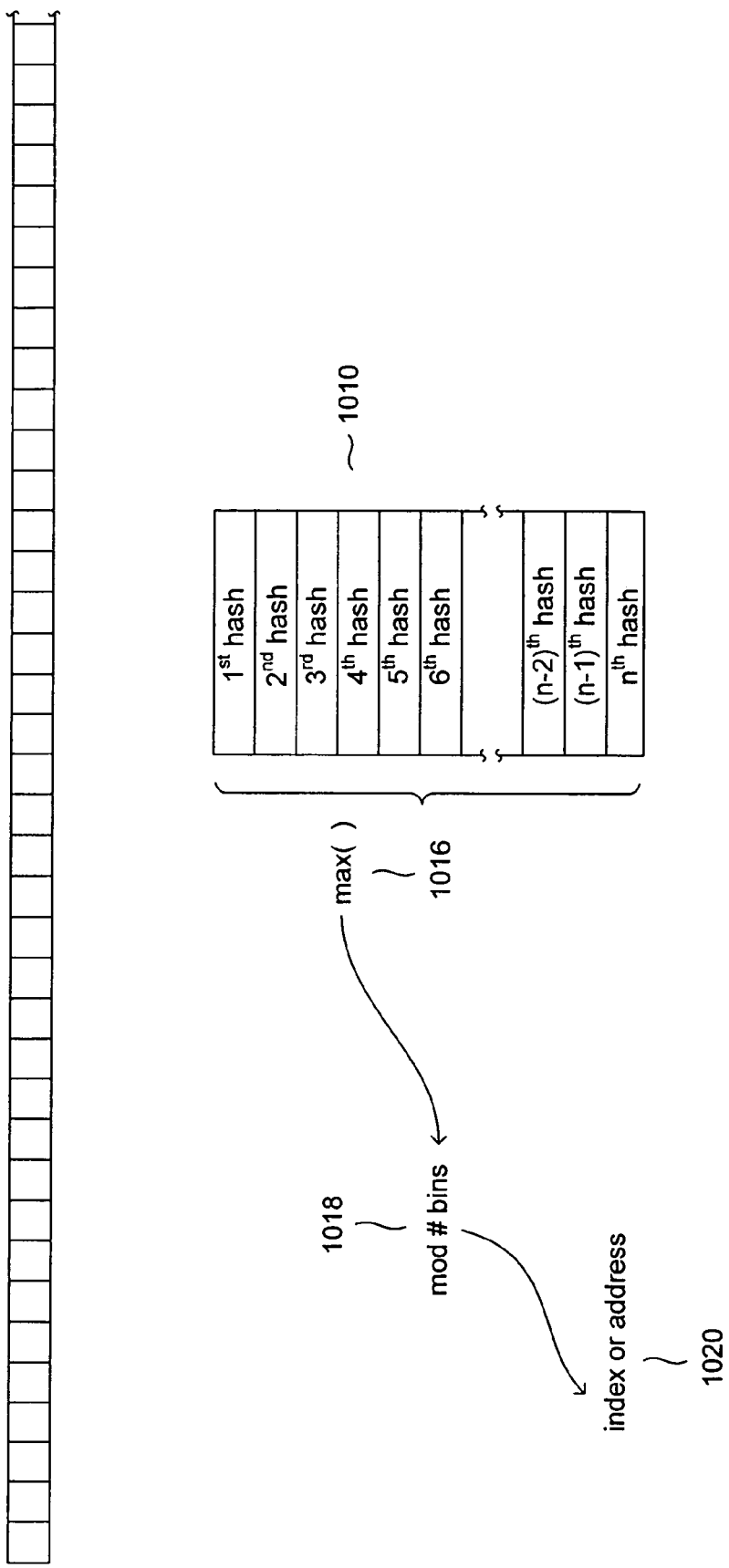

Next, as shown in FIG. 10D, a function 1016 is used to select one of the hash values from the hash-value array 1010, and the selected hash value is then used in an arithmetic operation 1018 to generate the index or address of a component data-storage system 1020. In the example shown in FIG. 10D, the function used to select a single hash value from the array of hash values is the max( ) function, which selects the hash value with largest numerical value. Alternatively, the smallest valued hash value may be selected in alternative embodiments, or a function that arithmetically computes a single characteristic value based on two or more hash values stored in the hash-value array may also be used in alternative implementations. In the example shown in FIG. 10D, the remainder of integer division of the selected or computed characteristic value by the number of component data-storage systems is used to generate a component data-storage-system index. In alternative embodiments, any of an almost limitless number of different mappings between computed values or hash values to component data-storage-system addresses or indexes may be employed. In still additional embodiments, a number k of the generated hash values may be selected for computation of one or more characteristic values, and the one or more characteristic values may be combined and arithmetically processed to generate one or more indexes, used to identify one or a number of component data storage systems.

FIG. 11 abstractly illustrates data-object routing in distributed data-storage systems. A data object 1102 is processed by the routing method 1104 to generate a component data-storage system address or index in order to direct the data object 1102 to a particular component data-storage system 1108 from among all of the component data-storage systems 1107-1113 that together compose a distributed, differential electronic-data storage system. Alternatively, the index or address may be used to direct the data object to a particular group of hierarchically arranged component data-storage systems. The data object 1102 is then transmitted to the selected component data-storage system 1108 for storage 1116.

The generalized routing method discussed above with reference to FIGS. 10A-D is characterized by three different parameters: (1) width, the width of the window of data units used to generate each hash value; (2) offset, the number of data units by which successive window placements are displaced from one another within the linear array of data units that represent the data object for successive hash-value computations; and (3) length, the number of hash values generated from which a single characteristic value is selected or computed. In many routing methods, these three characteristics, or parameters, have fixed values. However, in alternative embodiments and implementations, any one or more of the parameters may have varying values. For example, the offset could be increased by a fixed amount after generation of each hash value. In another example, the length may vary with the size of the data object, so that up to a length number of hash values is generated for each data object. In yet another example, the window size may vary as hash values are generated.

Query-Based Compression-Enhancing Routing Methods

Figure 12:
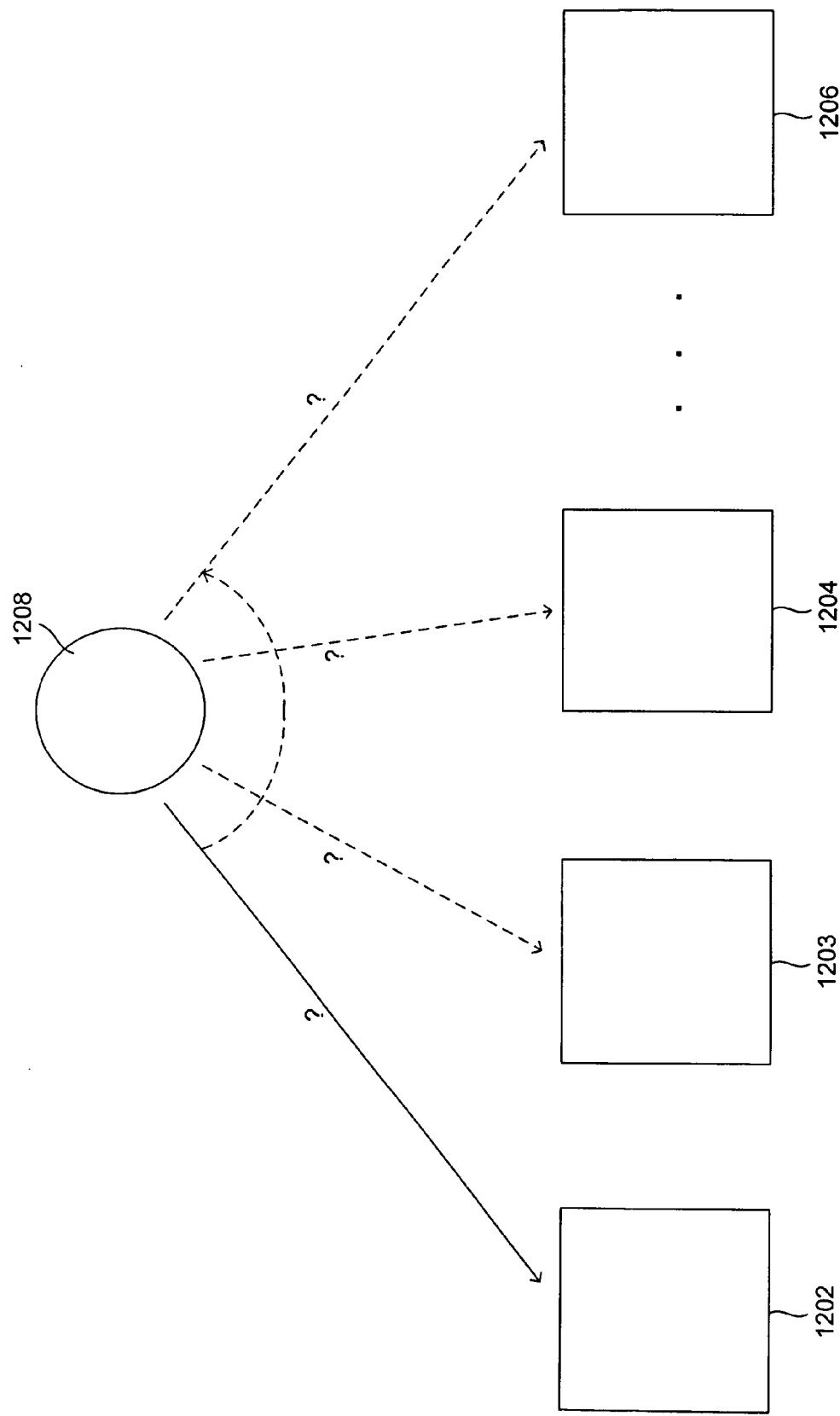
FIG. 12 illustrates a general query-based compression-enhancing routing method.

FIG. 12 illustrates a general query-based compression-enhancing routing method. FIG. 12 shows a number of component data-storage systems 1202-1206. In the general query-based routing method, a routing component 1208 of a distributed, differential electronic-data storage system receives a data object and queries each of the component data-storage systems to determine which of the component data-storage systems can store the data object with the highest level of differential-data-storage compression. The routing component 1208 evaluates the responses returned from the component data-storage systems and then routes the data object to the component data-storage system that can store the data object with greatest reported differential-data-storage compression for the data object.

Embodiments of the Present Invention

Figure 13B:
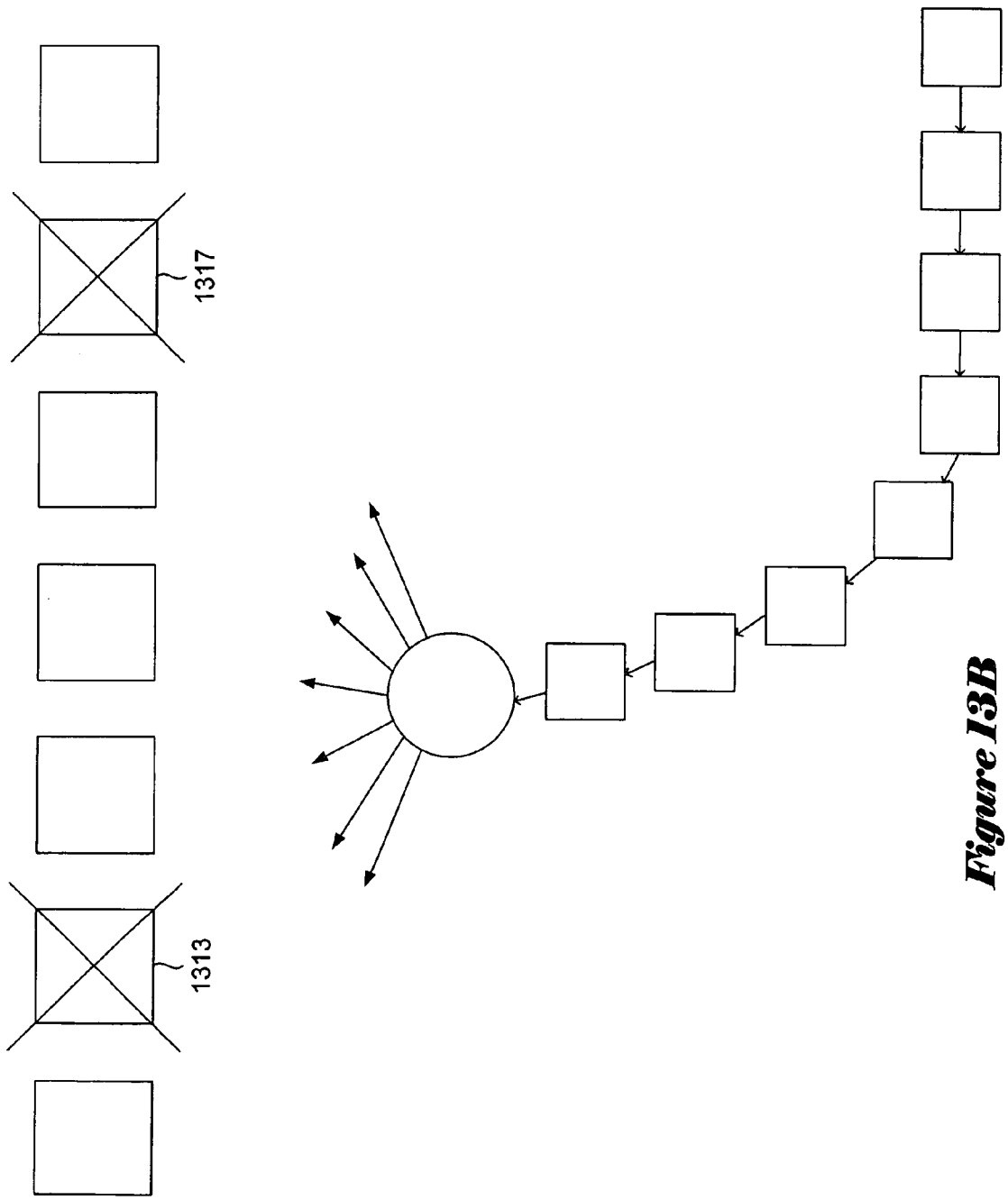
Figure 13C:
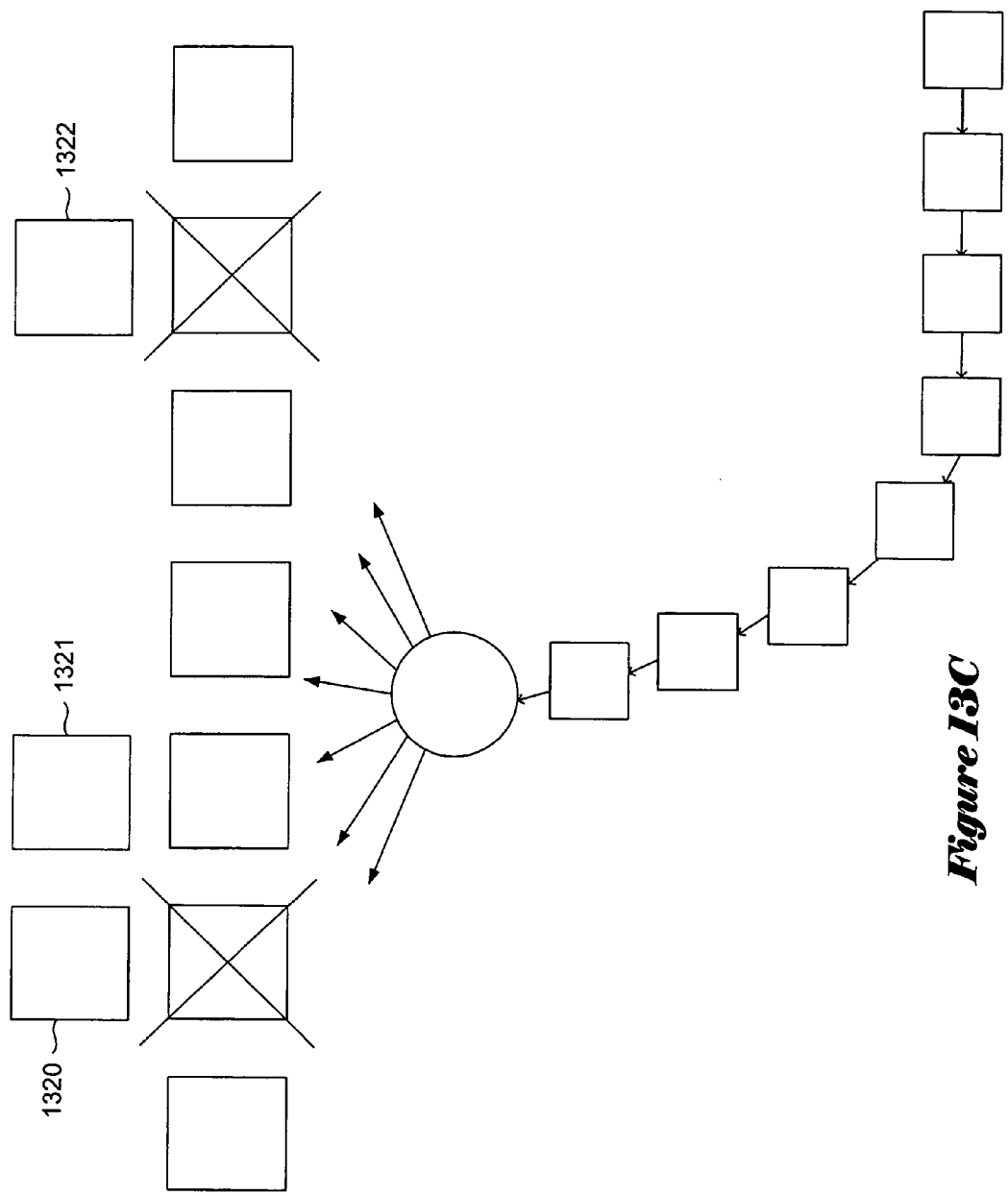

FIGS. 13A-C illustrate problems associated with certain types of compression-enhancing data-object routing methods. FIGS. 13A-C all use similar illustration conventions, described below with reference to FIG. 13A. As shown in FIG. 13A, within a distributed data-storage system, data objects 1302-1309 are transmitted from various clients to the distributed data-storage system in which a routing component 1310 routes the data objects to component data-storage systems 1312-1318. As discussed above, the routing component 1310, whether in client-side software, portals, component data-storage systems, or another location, uses a compression-enhancing data-object routing method to direct data objects to the component data-storage systems on which the data objects can be efficiently stored, generally the component data-storage systems on which the greatest compression can be obtained when the data objects are stored. As discussed above, various different types of compression-enhancing data-object routing methods employ similarity keys that describe data objects to compute addresses or identities of component data-storage systems within the distributed data-storage system to which data objects should be directed for storage.

When the number and identities or addresses of the component data-storage systems within the distributed data-storage system are static, the compression-enhancing data-object routing techniques discussed above obtain efficient storage of data objects within the distributed, differential data-object storage system. Unfortunately, in many real-world situations, distributed, differential data-object storage systems are not static, but are instead dynamic, with changing sets of component data-storage systems. For example, as shown in FIG. 13B, component data-storage systems, such as component data-storage systems 1313 and 1317, may become unavailable at various times for various reasons. For example, a component data-storage system may reach or come close to reaching its maximum data-storage capacity, and therefore need to suspend accepting additional data objects for storage. As another example, a component data-storage system may fail, or may be taken offline for maintenance. As shown in FIG. 13C, new component data-storage systems 1320-1322 may be added to a distributed data-storage system. In the case that component data-storage systems are suspended or removed from, and new component data-storage systems are added to, a distributed data-storage system, the compression-enhancing data-object routing method described above must be frequently altered to no longer route data objects to component data-storage systems that have been removed or suspended and to route data objects to newly added component data-storage systems so that data objects are stored on, and retrieved from, the current set of component data-storage systems. Retrieval operations may not involve the same component-data-storage-system identifying methods used for identifying a component-data-storage-system to which to direct a data object for storage. For example, if a component data-storage system has no remaining storage space, the component data-storage system may need to suspend accepting additional data-storage requests, but may continue to accept and execute data-retrieval operations. In such cases, methods used for identifying component data-storage systems to which to direct data-retrieval requests necessarily differ from methods used for identifying component data-storage systems to which to direct data-object-storage requests. Removal and addition of component data-storage systems may also upset the overall efficiency of differential data-object storage until an equilibrium state is again reached for the currently active set of component data-storage systems.

For these reasons, a need for alternative data-object routing methods designed for dynamic distributed data-storage systems in which component data-storage systems are added and removed has been recognized by designers, manufacturers, vendors, and users of distributed, differential, data-storage systems. One solution to the problems discussed above with reference to FIGS. 13A-C is to use a less precise data-object routing method that better takes into account the dynamic nature of a distributed data-storage system. Fuzzy data-object routing methods that represent embodiments of the present invention are next described in detail. Although the data-object routing methods of the present invention can be advantageously employed in various types of distributed, differential data-storage systems, they are more generally applicable to a wide variety of distributed data-storage systems.

Figure 14:
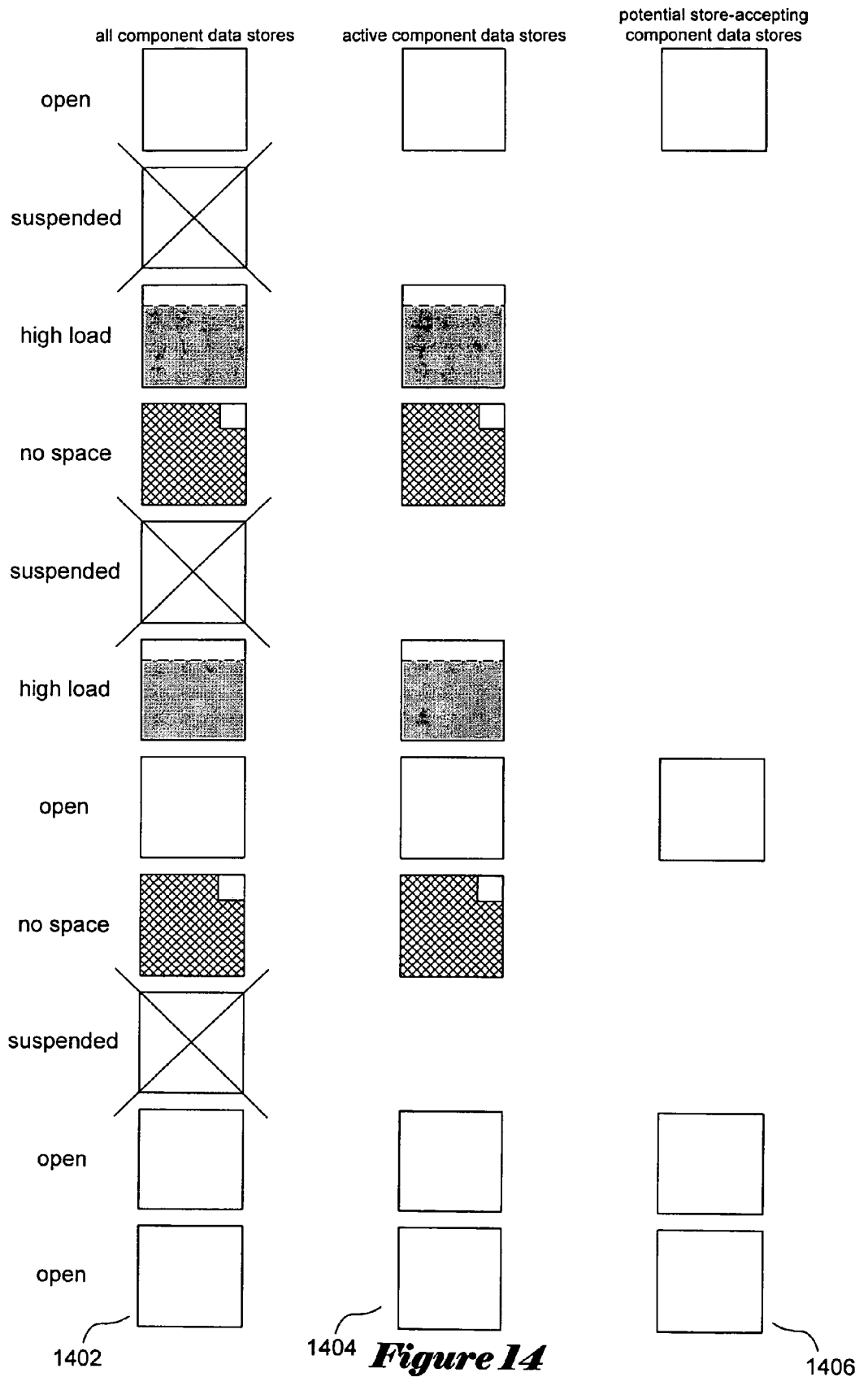
FIG. 14 illustrates a classification of the current operational states of component data-storage systems within a distributed data-storage system that is subsequently used to identify, according to embodiments of the present invention, several different target or target-group component data-storage systems within a distributed data-storage system used to implement store and a limited class of retrieval operations.

FIG. 14 illustrates a classification of the current operational states of component data-storage systems within a distributed data-storage system that is subsequently used to identify, according to embodiments of the present invention, several different target or target-group component data-storage systems within a distributed data-storage system used to implement store and a limited class of retrieval operations. In a first column 1402 of FIG. 14, all of the operational component data-storage systems within a distributed data-storage system are shown, with indications of the states of the component data-storage systems. Certain of these states, particularly the "no space" state, have meaning within a particular data-object context, as explained below. These states include: (1) "open," indicating that the component data-storage system is operational and currently accepting both data-object store and data-object retrieval requests; (2) "high load," indicating that the component data-storage system is currently executing requests at a high rate, and is therefore not a good candidate for being burdened with additional data-storage requests, and may even be too highly loaded to accept additional dataobject-retrieval requests; (3) "no space," indicating that the component data-storage system does not currently have sufficient storage space to store a particular data object, but can still accept data-object-retrieval requests; and (4) "suspended," indicating the component data-storage system is suffering from an internal error condition that prevents the component data-storage system from accepting data-storage requests, but the component data-storage system can nonetheless accept data-object-retrieval requests.

Although the above-described four states are considered for implementing data-object-related request routing, additional states of component data-storage systems are possible. For example, a component data-storage system may be failed or powered off. For the purposes of the current discussion, such states are ignored, and only operational component data-storage systems, or, in other words, component data-storage systems that can respond to requests transmitted to the component data-storage systems by a routing component or a client computer, are considered. Column 1404 in FIG. 14 includes those component data-storage systems shown in column 1402 that are considered to be active. Active component data-storage systems are those component data-storage systems that are in open, high-load, and no-space states. Component data-storage systems in the suspended state are not active. Column 1406 in FIG. 14 shows those component data-storage systems from column 1402 that are considered to be potential store-request-accepting component data-storage systems. Potential store-request-accepting component data-storage systems are those component data-storage systems in the open state.

Figure 15:
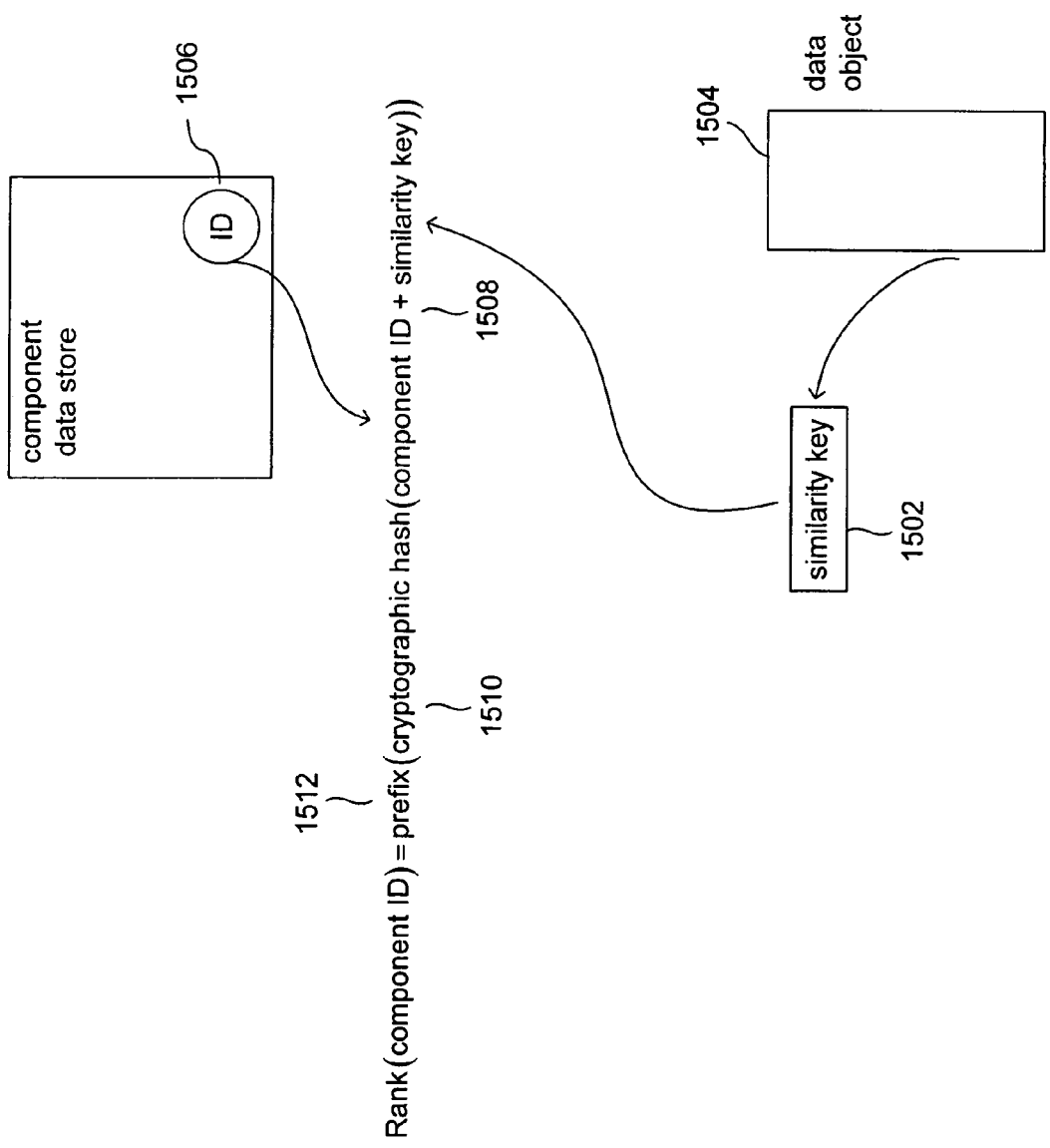
FIG. 15 illustrates computation of a rank for a component data-storage system-with respect to a particular data object according to embodiments of the present invention.

FIG. 15 illustrates computation of a rank for a component data-storage system with respect to a particular data object according to embodiments of the present invention. Computed rank values are used in order to identify target component data-storage systems for store and retrieval operations. Thus, a rank computed for a component data-storage system is computed within the context of a particular data object. In computing a rank for a component data-storage system, a similarity key 1502 is first computed from the data object 1504 by any of the methods described above. Similarity keys are intended to be strings of symbols that represent the contents of a data object such that two data objects with identical similarity keys likely to be identical or to at least share sufficient common data that storage of the two objects on a single component data-storage system will be likely to use less storage space than the sum of the sizes of the two data objects. For example, in a system where objects are broken into sub-sequences (i.e., "chunks"), similar objects would share some common data sub-sequences.

Any of a large variety of methods can be used to generate similarity keys, including the method described above with reference to FIGS. 10A-D, which is applicable to systems that allow object sub-sequences to be shared. In a system where duplicate whole objects are not stored, a full document hash may be used as a similarity key, since there may be little benefit to collocating objects that are not identical.

Once a similarity key has been obtained, a component data-storage-system ID or address, referred to subsequently to as the "component ID," 1506 is obtained for the component data-storage system for which the rank is computed. A component ID may be an index, an address, an arbitrary numerical identifier, or any other value by which component data-storage systems are identified within a distributed data-storage system. Note that the component ID is an identifier for the set of data stored in a component store. Therefore, the same component ID is generally used throughout the lifecycle of a component store, and is generally not changed unless the data in the component store is removed. In addition, if the data in a component store is moved, in its entirety, to a different component data-storage system, the component ID is generally moved to the different component data-storage system along with the data.

The component ID and similarity key are combined, as indicated by the "+" sign 1508 in FIG. 15. For example, the component ID and similarity key may be concatenated, first truncated and then concatenated, or combined by any of an essentially limitless number of different combination methods including a variety of binary logic, arithmetic, or symbol-string operations that produce a single result. The combined component ID and similarity key are then hashed by a cryptographic hash function 1510, or processed by a similar function or operation that generates a value from the combined similarity key and component ID and that uniformly distributes the values computed from combined component IDs and similarity keys across a predefined range of computed values. Finally, a portion of the computed value generated by hashing or otherwise processing the combined component ID and similarity key is selected as a numerical rank value. For example, in the rank operation shown in FIG. 15, a prefix operation 1512 is carried out to select the first eight bytes of the hash value generated by the cryptographic hash function. There are innumerable different possible ways for computing rank values for component IDs within the context of a particular data object. A variety of different cryptographic hash functions, or other similar operations, can be used. Selection of a portion of the computed value generated by the cryptographic hash function or other function can be carried out in a variety of different ways, including selecting a prefix, suffix, some number of bytes distributed through the set of bytes representing the hash value, and other such portions of the computed value.

Figure 16:
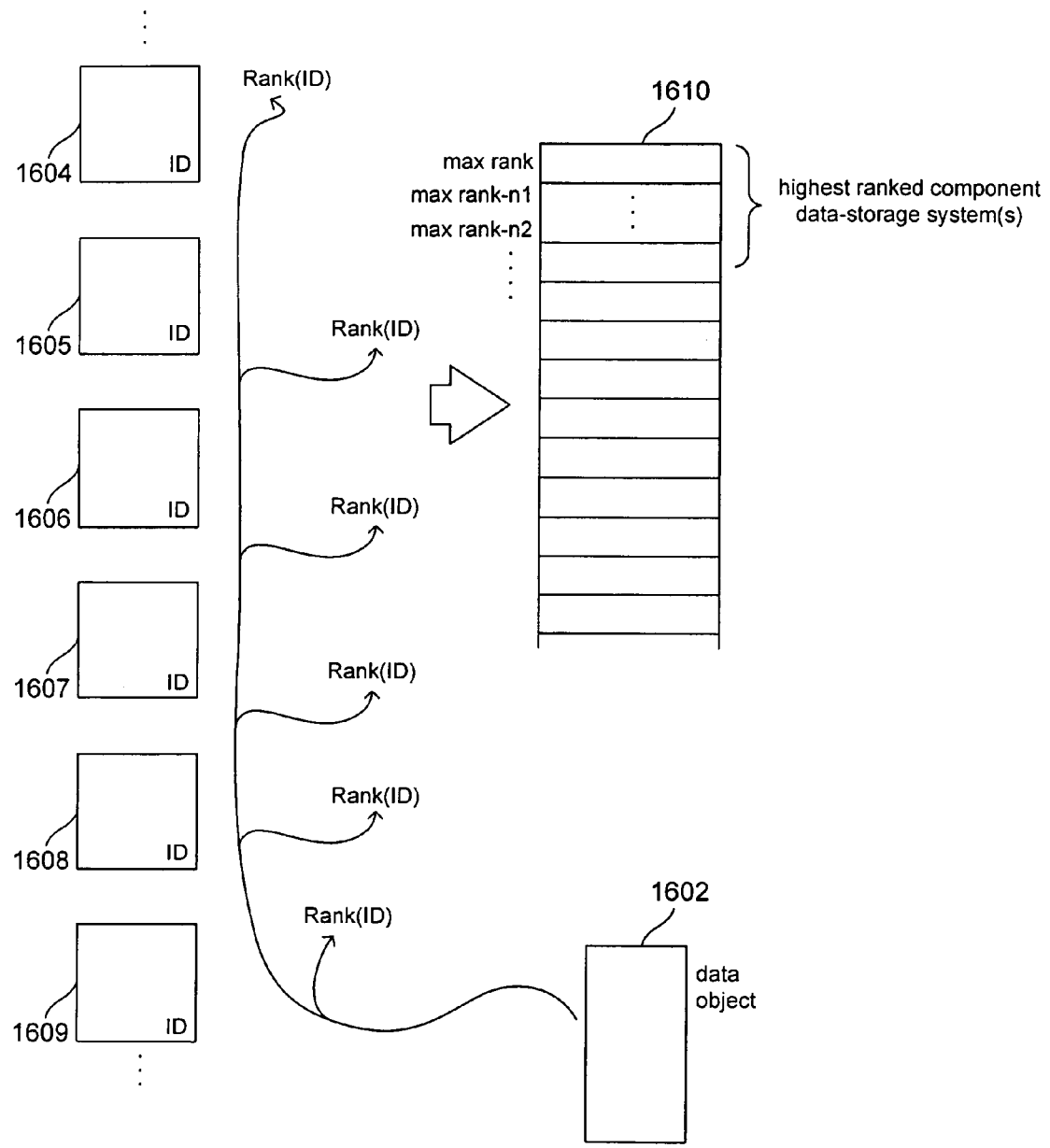
FIG. 16 illustrates selection of a target or target group of component data-storage systems with respect to a particular data object using a rank value computed as illustrated in FIG. 15 according to embodiments of the present invention.

FIG. 16 illustrates selection of a target or target group of component data-storage systems with respect to a particular data object using a rank value computed as illustrated in FIG. 15 according to embodiments of the present invention. In FIG. 16, a particular data object 1602 represents the context in which ranks are computed for each of the component data-storage systems 1604-1609 within a distributed data-storage system. In one possible embodiment of target-component-data-storage-system selection, a list or array of component IDs 1610 is sorted and indexed by the ranks computed for the component data-storage systems. Finally, in the component data-storage system, or component data-storage systems, the highest computed ranks are selected as the target, or target group, respectively, of component data-storage systems. In alternative embodiments, the ranks are computed in an iterative loop, with variables storing the maximum rank and component ID of the component data-storage system for which the maximum rank is computed. The local variables are updated within the loop as successive rank values are computed for successive component data-storage systems. Many other ways to determine the single highest-ranked or group of highest-ranked component data-storage systems are possible. In many embodiments of the present invention, only a single, highest-ranked component data-storage system is selected as a target or preferred type of component data-storage system. However, alternative embodiments may select two or more highest-ranked component data-storage systems for various purposes.

Figure 17:
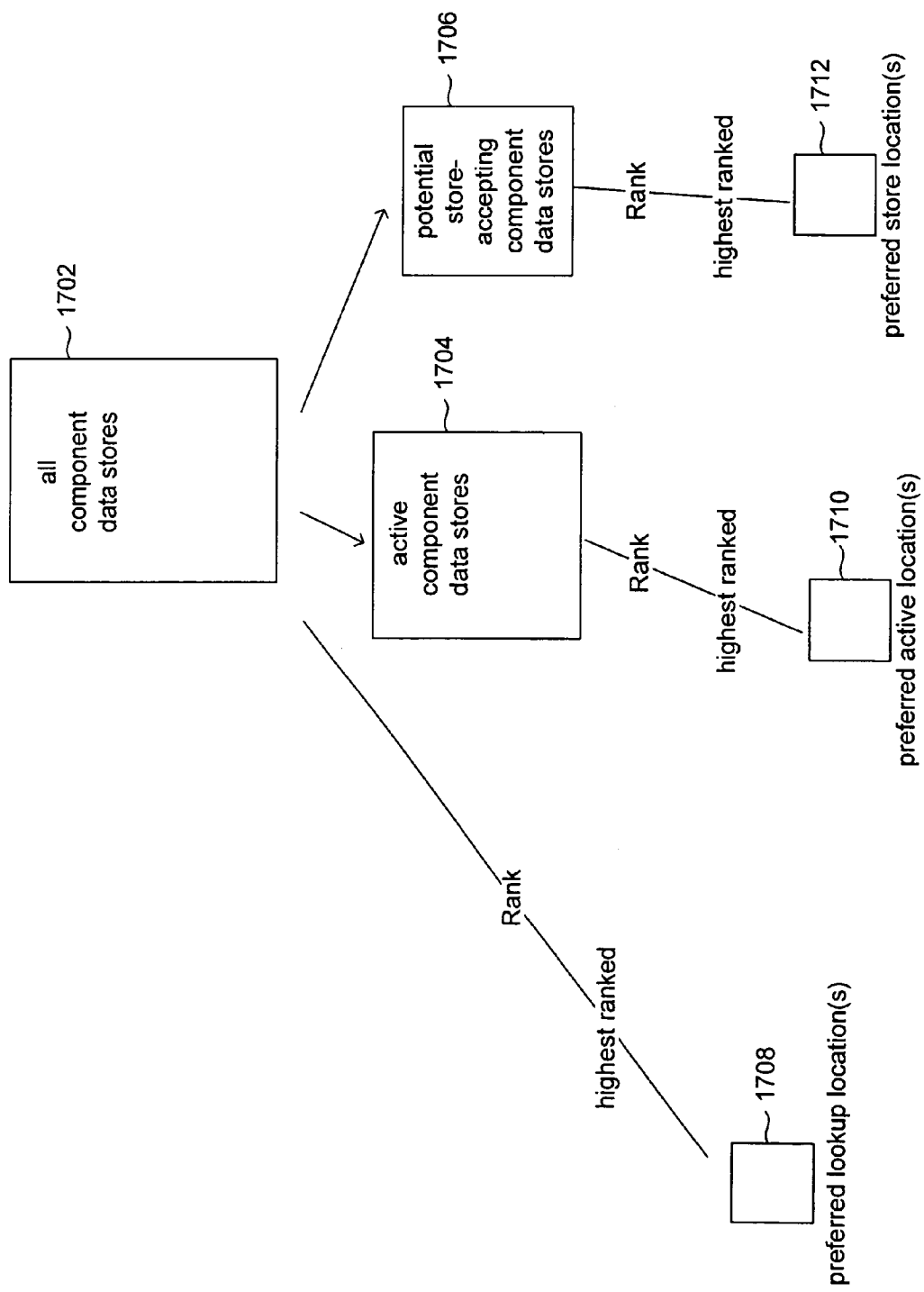
FIG. 17 illustrates selection of a preferred look-up location or locations, a preferred active location or locations, and a preferred store location or locations used in data-object routing operations according to embodiments of the present invention.

FIG. 17 illustrates selection of a preferred look-up location or locations, a preferred active location or locations, and a preferred store location or locations used in data-object-routing operations according to embodiments of the present invention. As shown in FIG. 17, all operational component data-storage systems within a distributed data-storage system 1702, represented in column 1402 in FIG. 14, form the underlying group from which the preferred look-up location(s), preferred active location(s), and preferred store location(s) are selected. As discussed above with reference to FIG. 14, the active component data-storage systems 1704 and potential store-request-accepting component data-storage systems 1706 are subgroups of the group of all operational component data-storage systems 1702. With a particular data object as a context, ranks can be computed for the component data-storage systems, and the highest-ranked component data-storage system or component data-storage systems can be selected as a target or target group. As shown in FIG. 17, the preferred look-up location(s) 1708 is the highest-ranked component data-storage system (or systems) with respect to all of the operational component data-storage systems 1702. The preferred active location(s) 1710 is the highest-ranked component data-storage system (or systems) selected from the active component data-storage systems 1704. The preferred store location(s) 1712 is the highest-ranked component data-storage system (or systems) selected from the potential store-request-accepting component data-storage systems 1706. The three target component data-storage systems or groups of component data-storage systems, preferred look-up location(s), preferred active location(s), and preferred store location(s), are used for querying component data-storage systems during execution of data-object-related-request routing.

Figure 18A:
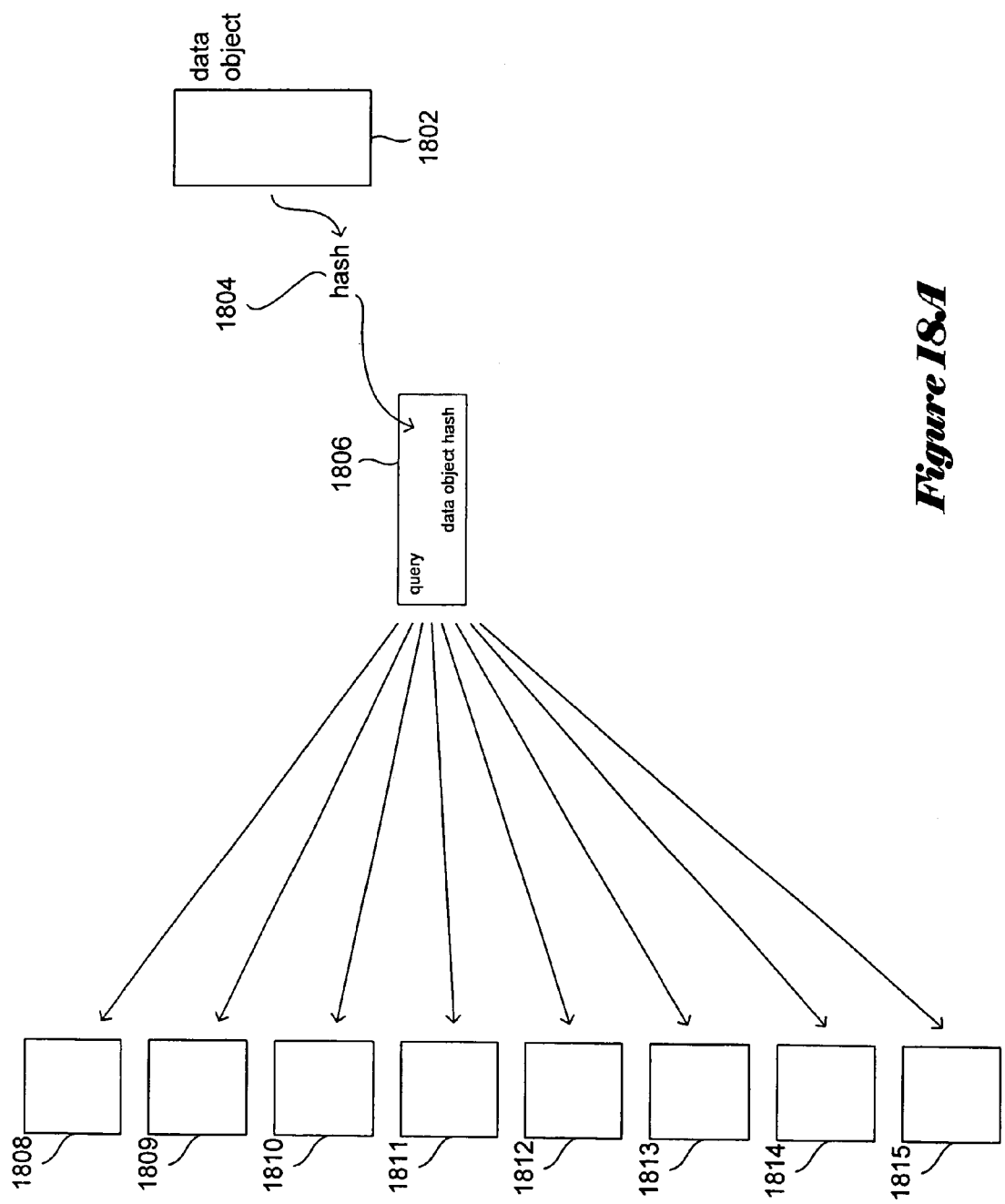

FIGS. 18A-F illustrate a data-object store operation that represents an embodiment of the present invention. FIGS. 18A-F all use similar illustration conventions, described with reference to FIG. 18A. A data object 1802 is received by a routing component of a distributed data-storage system for storage within the distributed data-storage system. A hash of the entire data object may also be supplied, along with the data object, in a request for storing the data object, or a data-object hash 1804 can be generated by the routing component. In certain embodiments, a symbol string indicating the hash algorithm used to generate the hash may be appended to the hash so that hash values are self-describing. The data object hash is included within a query 1806 issued to each of the component data-storage systems 1808-1815 by the routing component of the distributed data-storage system. Each of the component data-storage systems searches a hash index stored within the component data-storage system in order to determine whether or not a data object with the hash value is currently stored within the data-storage system. If, as shown in FIG. 18B, one or more component data-storage systems currently stores a data object with the hash value included in the query, then the component data-storage system or systems return a universal identifier for the stored data object back to the routing component. The routing component can then return the universal identifier to the client requesting storage of the data object (1802 in FIG. 18A). The client can then decide whether or not to store a redundant copy of the data object, since return of the universal identifier indicates that the data object has been previously stored within the distributed data-storage system.

Significant storage efficiency can be obtained by storing only a single instance, or copy, of each data object. Of course, as described above, component data-storage systems are designed to automatically store multiple copies of data objects to prevent loss of data objects in the case of failure of a storage medium. A single instance or single copy refers to the fact that only a single store request has been successfully executed by the distributed data-storage system for a particular data object, although the component data-storage systems storing the data object may, in fact, store multiple copies of the data object. A universal identifier can be used by the client to retrieve the stored object from the distributed data-storage system and uniquely identifies a data object and the component data-storage system on which it is stored within the distributed data-storage system. Also, there is a small chance that the data object found by a hash index is not identical to the data object that is being stored, or, in other words, the hashes computed for the two different data objects may collide. The likelihood of such collisions can be made arbitrarily small by selecting proper hash functions and/or incorporating additional information in the comparison of a stored data object to a data object to be stored.

Figure 18C:
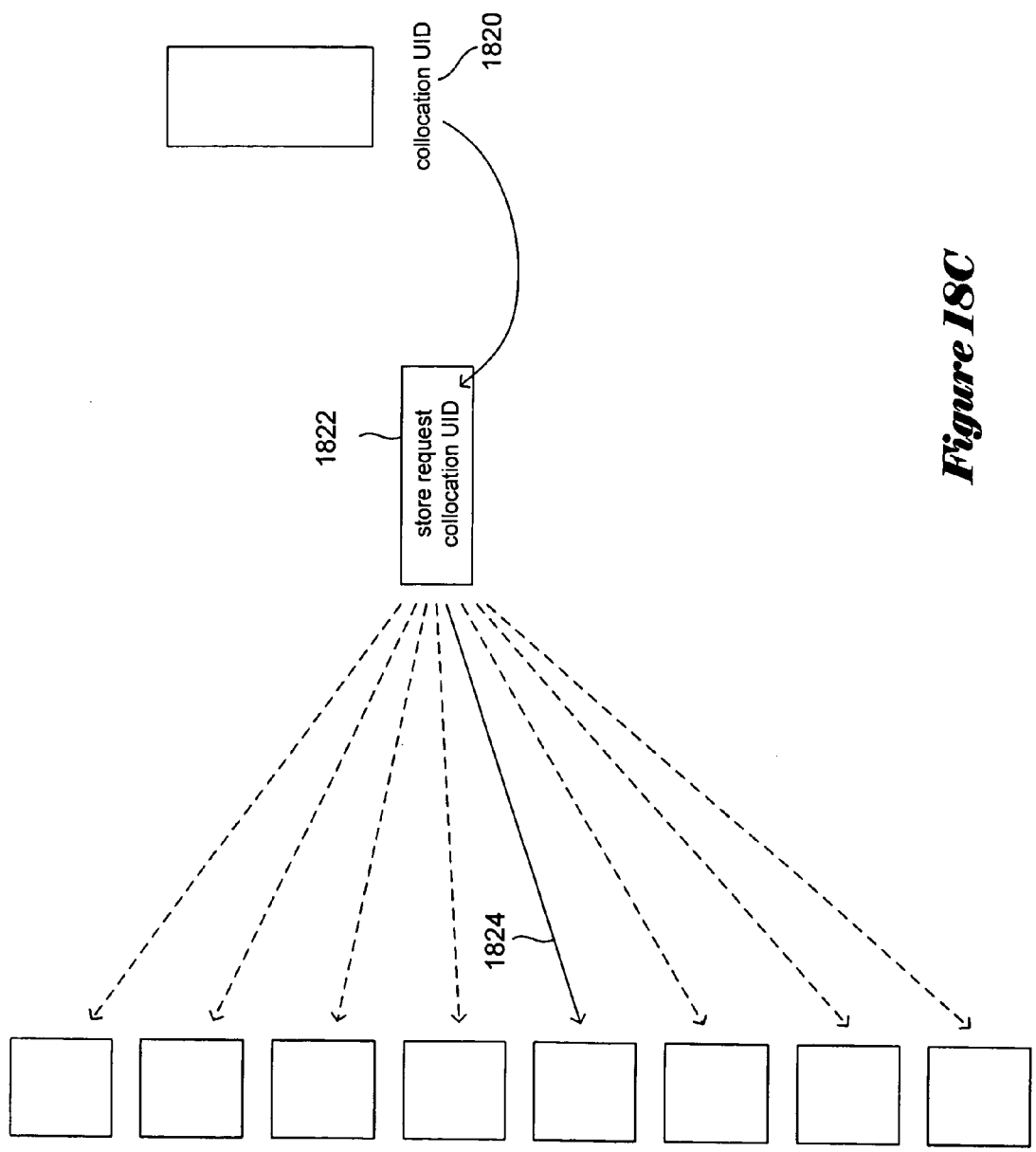

If no component data-storage system can find a hash value within a local index equal to the hash value in the initial query (1806 in FIG. 18A), or if the client decides to request storage of the data object despite an indication that the data object has been previously stored, then, as shown in FIG. 18C, the routing component may optionally use a collocation universal identifier 1820 supplied by the client along with the data object, to attempt to store the data object in the component data-storage system in which a data object corresponding to the collocation universal identifier is currently stored. The routing component creates and transmits a store request that includes the collocation universal identifier 1822 to each of the component data-storage systems in a distributed data-storage system, in the case that the routing component cannot determine, using local indexes and directories, which of the component data-storage systems currently stores the data object corresponding to the collocation universal identifier. If the routing component can determine the particular component data-storage system currently storing the data object corresponding to the supplied collocation universal identifier, then the store request 1822 can be sent directly to that particular component data-storage system, as indicated by the bold arrow 1824 in FIG. 18C. If, as shown in FIG. 18D, the store request is successfully executed by a component data-storage system, then the component data-storage system returns the universal identifier for the stored data object which is, in turn, returned by the routing component to the client to indicate a successful data-object store. It should be noted that use of collocation universal identifiers is an optional feature of the routing methods that represent embodiments of the present invention..

Figure 18E:
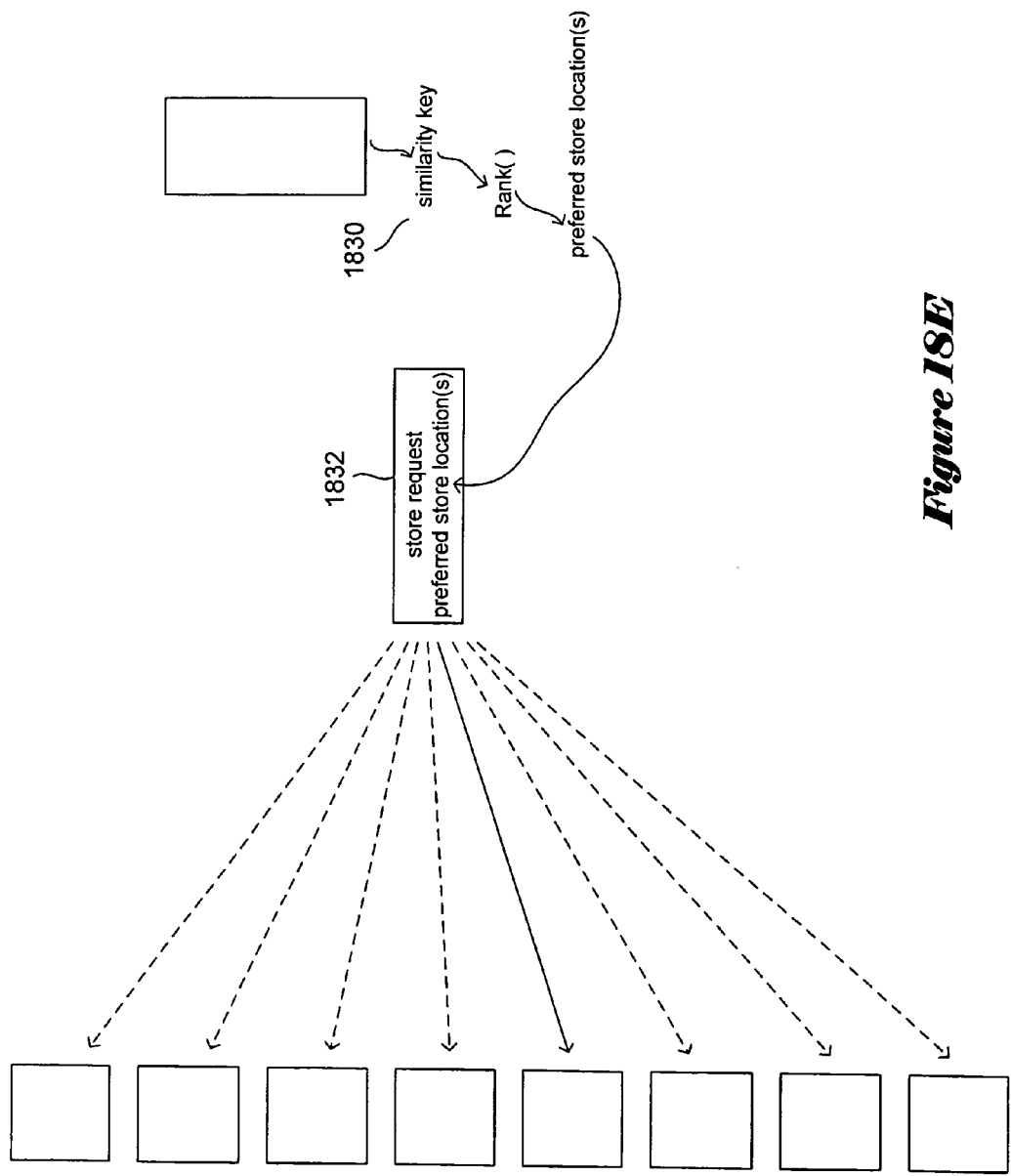
Figure 18F:
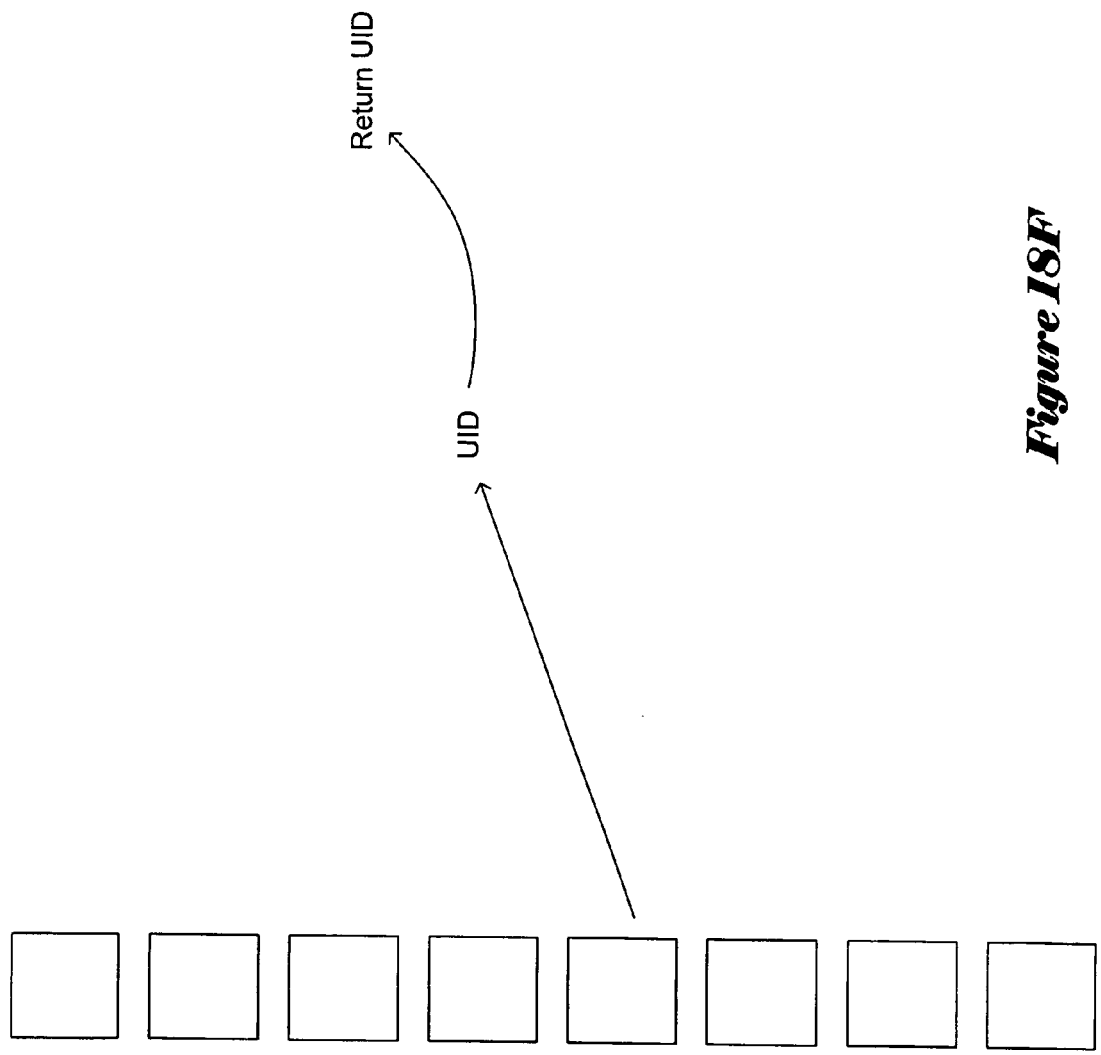

When the client does not provide a collocation universal identifier as part of the data-object storage request, or when the attempt to store the data object on the component data-storage system currently storing a data object corresponding to the collocation universal identifier fails as, for example, when the component data-storage system is down or full, then, as shown in FIG. 18E, the routing component attempts to store the data object on the preferred store location(s). As shown in FIG. 18E, a similarity key is computed by the routing component or received from the client computer 1830 and used to compute ranks for the potential store-request-accepting component data-storage systems within the distributed data-storage system, in turn used to compute the preferred store location(s). The routing component then prepares a store request that includes the computed preferred store location(s) 1832 and sends the store request either directly to the preferred store location(s) or to all component data-storage systems within a distributed data-storage system. In the latter case, only those component data-storage systems that have IDs or addresses that match the preferred store location(s) execute the store request. If the store request is successfully executed, as shown in FIG. 18F, then the component data-storage system or systems that successfully execute the store request return a universal identifier to the routing component, which the routing component, in turn, returns to the client indicating successful storage.

If a store of the data object to the preferred store location(s) fails, or cannot be carried out by the routing component due to insufficient information supplied by the client, the routing component can alternatively attempt to store the data object to a any active component data-storage system or systems and, in the worst case, can employ a round-robin or other fair routing mechanism, to select a component data-storage system to which to direct a data-object storage request.

Figure 19:
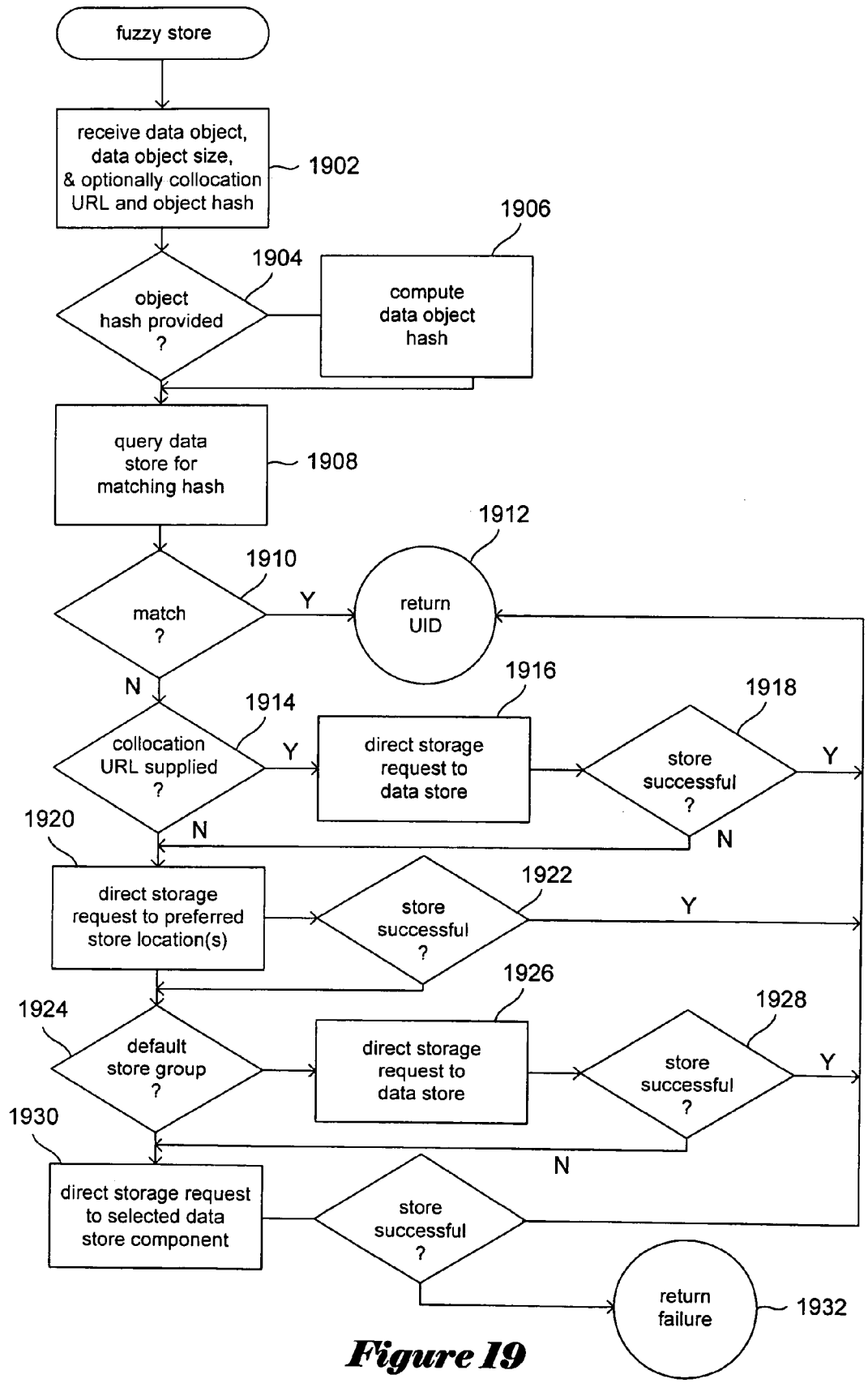
FIG. 19 is a control-flow diagram illustrating the store operation discussed above with reference to FIGS. 18A-F that represents an embodiment of the present invention.

FIG. 19 is a control-flow diagram illustrating the store operation discussed above with reference to FIGS. 18A-F that represents an embodiment of the present invention. In step 1902, the routing component receives a data object, data object size, and optionally a collocation URI and object hash from a requesting client. If the object hash is not supplied by the client, as determined in step 1904, then the routing component may compute a data object hash in step 1906. In step 1908, the routing component, as described above with reference to FIGS. 18A-B, issues a query to the component data-storage systems to determine which component data-storage systems currently store a data object with the hash computed for the data object or supplied by the client in the storage request. If a component data-storage system responds with a universal identifier indicating that the component data-storage system currently stores an object with a hash that matches the hash supplied in the query, as determined in step 1910, then the routing component can return that universal identifier 1912 to the client to indicate that the data object is already stored within the distributed data-storage system. If no matching hash is found, then, if a collocation universal identifier was supplied by the client, as determined in step 1914, then the routing component can direct a storage request to one or more component data-storage systems, depending on whether the routing component can determine which component data-storage system may currently store a data object corresponding to the collocation universal identifier in step 1916. If the storage of the data object is successfully completed by a component data-storage system, as determined in step 1918, then a universal identifier for the stored data object can be returned in step 1912. Otherwise, in step 1920, the routing component can direct a storage request to the preferred storage location(s) as discussed above with reference to FIGS. 18E-F. If the storage request is successfully executed as determined in step 1922, then the URI returned by the component data-storage system that executed the storage request can be returned to the client, in step 1912. Otherwise, if a default component data-storage system or systems is known by the routing component for the data object, as determined in step 1924, then the routing component can direct a storage request to the default component data-storage system or systems, in step 1926. If the store is successfully carried out, as determined in step 1928, then the universal identifier returned by the component data-storage system that successfully stores the data object can, in turn, be returned to the client, in step 1912. Otherwise, the routing component can select a component data-storage system and direct a storage request to the selected component data-storage system, in step 1930, returning either a universal identifier in step 1912 or a failure indication in step 1932. As discussed above, the selection can be made based on a round-robin or other fair distribution algorithm.

Figure 20:
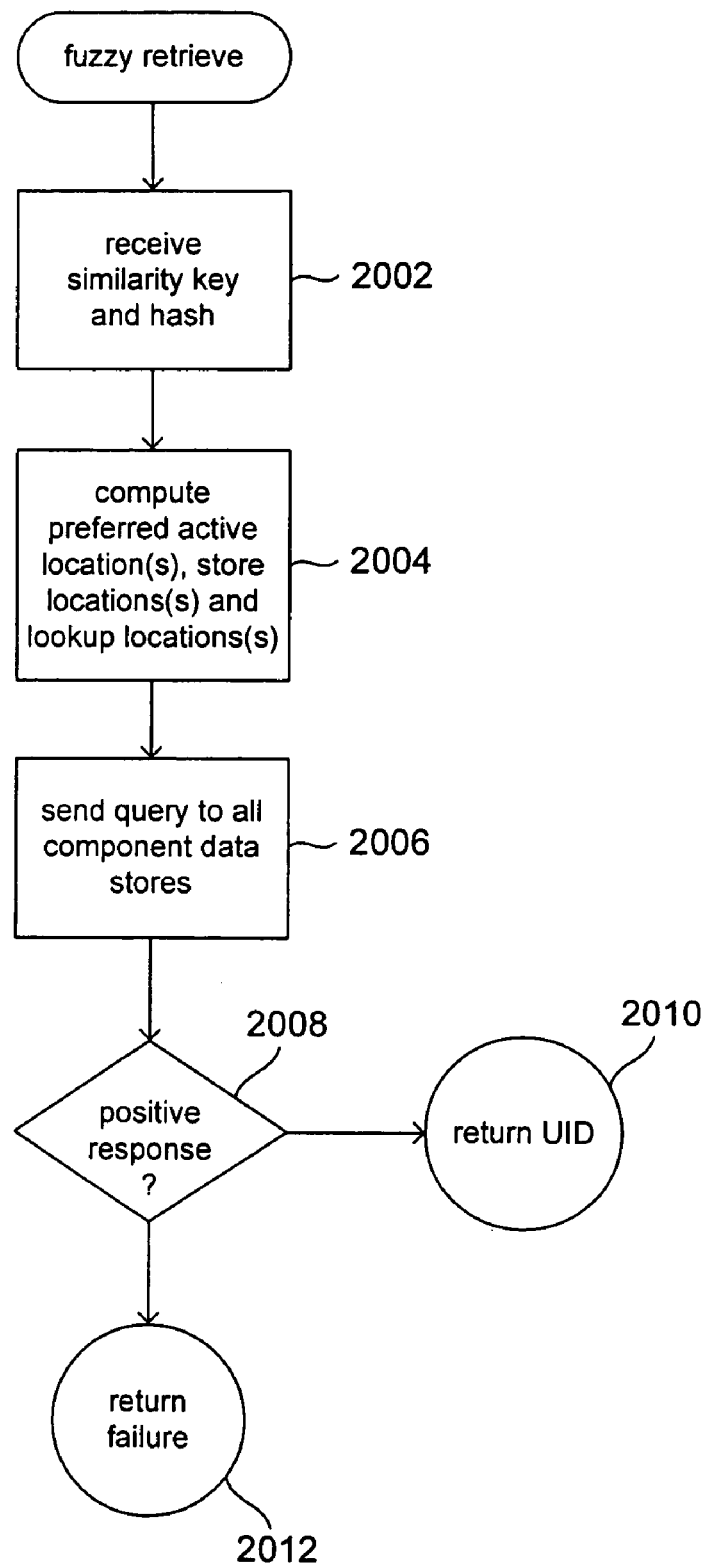
FIG. 20 is a control-flow diagram illustrating the store operation that is discussed above with reference to FIGS. 18A-F and that represents an embodiment of the present invention.

FIG. 20 is a control-flow diagram illustrating the store operation that is discussed above with reference to FIGS. 19A-F and that represents an embodiment of the present invention. A data-object retrieval method can be carried out by the distributed, data-storage system when, for example, a client can supply a similarity key for the data object that the client wishes to retrieve from the distributed data-storage system. Indeed, such methods are employed in step 1908 shown in FIG. 19, above. In step 2002, the distributed data-storage system receives the similarity key from a client requesting retrieval of a data object corresponding to the similarity key. In step 2004, the distributed data-storage system computes the preferred active location(s), preferred store location(s), and preferred look-up location(s), as discussed above with reference to FIG. 17. Then, in step 2006, the distributed data-storage system sends a query to all component data-storage systems that includes the computed preferred active location(s), preferred store location(s), and preferred look-up location(s), as well as the similarity key. Only those component data-storage systems' component IDs that match one or more of the preferred active look-up location(s), preferred store location(s), and preferred active location(s) carry out the retrieval request. If a data object is found in those component data-storage systems that carry out the retrieval request and return a positive response, as determined in step 2008, then the universal identifier returned by a component data-storage system that currently stores the data object with the supplied similarity key is returned to the client, in step 2010. Otherwise an indication of failure is returned in step 2012. Then, depending on the application requirements, the other data stores can optionally be queried. This method has the effect of reducing the likelihood that a query would require a full system broadcast, since most requests would be satisfied by the preferred locations. Note that, for single-instancing, it would not be desirable to perform a full system query when the initial query fails, because single instancing queries are likely to return negative results and are there therefore likely to generate too many queries, resulting in a full system broadcast.

Although the present invention has been described in terms of a particular embodiment, it is not intended that the invention be limited to this embodiment. Modifications within the spirit of the invention will be apparent to those skilled in the art. For example, an essentially limitless number of different implementations of the routing methods of the present are possible, the implementations programmable in a variety of different programming languages, using alternative flow-control, data structures, modular organizations, targeted for execution on any number of different hardware platforms supporting various different operating systems. A wide variety of distributed electronic-data storage systems that employ routing methods are also possible. An almost limitless number of methods for ranking component data storage systems according to the present invention are possible, using different randomizing distribution methods, including different types of cryptographic hash functions, different types of similarity keys and component-data-storage-system identifiers, and different partial-value-selection methods for selecting a final rank value from a symbol string.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A data-object-related-request routing method employed in a distributed electronic-data storage system comprising a routing component and component data storage systems, the data-object routing method comprising:
   computing, by the routing component of the distributed electronic-data storage system, a number of ranks for the number of component data storage systems based on data contained in the data object and, for each rank, on an identifier of the corresponding component data storage system that identifies a set of data stored in the component data storage system;
   selecting, by the routing component of the distributed electronic-data storage system, one or more target component data storage systems based on the computed ranks for each operational component data storage system within the distributed electronic-data storage system; and
   directing, by the routing component of the distributed electronic-data storage system, a data-object-related request to the selected one or more target component data storage systems.

2. The data-object-related-request routing method of claim 1 wherein computing a rank for a component data storage system further includes:
   combining a similarity key that represents the data object with an identifier for the component data storage system;
   computing a value, based on the combined similarity key and identifier, by a method that distributes values over a range of possible computed values; and
   selecting from the computed value a numerical rank.

3. The data-object-related-request routing method of claim 2 wherein combining a similarity key that represents the data object with an identifier for the component data storage system further includes combining the similarity key and identifier further includes one of:
   concatenating the similarity key and identifier;
   concatenating portions of the similarity key and identifier; and
   generating a single value from the similarity key and identifier by one of a bit-wise logic, arithmetic, or symbol-string operation.

4. The data-object-related-request routing method of claim 2 wherein computing a value, based on the combined similarity key and identifier, by a method that randomly or pseudo-randomly distributes values over a range of possible computed values further comprises applying a hash function to the combined similarity key and identifier.

5. The data-object-related-request routing method of claim 2 wherein selecting from the computed value a numerical rank further comprises selecting a number of bits from the computed value.

6. The data-object-related-request routing method of claim 5 wherein the selected bytes represent one of:
   a prefix of the computed value;
   a suffix of the computed value; and
   a fixed number of bits selected from among the bits that together comprise the computed value.

7. The data-object-related-request routing method of claim 2 wherein selecting from the computed value a numerical rank further comprises applying a unary logical, arithmetic, or symbol-string function to the computed value that generates a result comprising a smaller range of possible values by which the computed value is represented.

8. The data-object-related-request routing method of claim 1 wherein selecting one or more target component data storage systems based on the computed ranks for each operational component data storage system within the distributed, differential electronic-data storage system further includes selecting one or more of:
   a preferred lookup location or locations from among all operational component data-storage systems within the distributed, differential electronic-data storage system;
   a preferred active location or locations from among all active component data-storage systems within the distributed, differential electronic-data storage system; and
   selecting a preferred store location or locations from among all store-request-accepting component data-storage systems within the distributed, differential electronic-data storage system.

9. The data-object-related-request routing method of claim 8 wherein:
   active component data-storage systems include component data-storage systems that are operational and that are not available for storage requests; and
   store-request-accepting component data-storage systems include component data-storage systems that are operational, not suspended, have sufficient data storage space for a particular data object, and are not currently operating at a load greater than a high-load threshold.

10. The data-object-related-request routing method of claim 8 wherein data-object-related requests include store requests and retrieval requests.

11. The data-object-related-request routing method of claim 10 wherein a store request is carried out by:
   receiving a data object to store;
   determining whether or not a component data-storage system currently stores the data object;
   when the object is determined to be currently stored by a component data-storage system, returning a universal identifier for the data object that identifies the location of the stored data object;
   when the object is determined to not be currently stored by a component data-storage system, storing the data object on a selected component data-storage system.

12. The data-object-related-request routing method of claim 11 wherein storing the data object on a selected component data-storage system further comprises:
   when a collocation universal identifier has been provided for the data object, transmitting a store request to the component data-storage system that currently stores a data object described by the collocation universal identifier; and
   when no collocation universal identifier has been provided for the data object,
      when a similarity key is provided for the data object or can be computed for the data object, transmitting a store request to the preferred store location or preferred store locations, and
      otherwise selecting a component data-storage system to which to transmit a storage request by a fairness method.

13. The data-object-related-request routing method of claim 10 wherein a retrieval request is carried out by transmitting a retrieval request including a similarity key and indications of the preferred lookup location or locations, preferred active location or locations, and preferred store location or locations, to the operational component data-storage systems within the distributed, differential electronic-data storage system, with only the component data-storage systems corresponding to the preferred lookup location or locations, preferred active location or locations, and preferred store location or locations attempting to carry out the retrieval request.

14. A routing component of a distributed electronic-data storage system that executes data-object-related-request routing method of claim 1.

15. The routing component of claim 14 included in one or more of:
- client-side distributed electronic-data-storage-system executables;
- portal components of the distributed electronic-data storage system; and
- one or more of the component data-storage systems.

16. Computer instructions that implement the data-object-related-request routing method of claim 1 encoded in a computer-readable memory.

* * * * *